(12) United States Patent
Hashimoto et al.

(10) Patent No.: US 7,019,433 B2
(45) Date of Patent: Mar. 28, 2006

(54) ARMATURE OF ROTATING ELECTRIC MACHINE

(75) Inventors: Akira Hashimoto, Tokyo (JP); Yasuki Kimura, Tokyo (JP); Satoshi Yamashiro, Tokyo (JP); Yuji Nakahara, Tokyo (JP); Kouki Naka, Tokyo (JP); Hidetoshi Teruyama, Tokyo (JP); Manabu Kobayashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/798,381

(22) Filed: Mar. 12, 2004

(65) Prior Publication Data

US 2004/0189137 A1   Sep. 30, 2004

(30) Foreign Application Priority Data

Mar. 31, 2003 (JP) ............... 2003-093178
Dec. 12, 2003 (JP) ............... 2003-414105

(51) Int. Cl.
H02K 1/18 (2006.01)
H02K 15/02 (2006.01)
H02K 21/12 (2006.01)

(52) U.S. Cl. ............... 310/259; 310/218; 310/254
(58) Field of Classification Search ............... 310/218, 310/254, 259, 216
See application file for complete search history.

(56) References Cited

U.S. PATENT DOCUMENTS 5,909,072 A * 6/1999 Muller .................. 310/68 B 6,369,480 B1 * 4/2002 Nishiyama et al. ..... 310/156.53

FOREIGN PATENT DOCUMENTS

| JP | 7-007875 | | 1/1995 |
| JP | 09009534 A | * | 1/1997 |
| JP | 9149568 | | 6/1997 |
| JP | 10-174319 A | | 6/1998 |
| JP | 10271716 A | * | 10/1998 |
| JP | 2003079111 A | * | 3/2005 |
| JP | 2001-218429 | * | 8/2005 |

OTHER PUBLICATIONS

Machine Translation of paragraphs 23-54 of JP09-009534 (Oct. 1997) from JPO website:□□http://www19.ipdl.ncipi.go.jp/PA1/cgi-bin/PA1DETAIL.*
Chian Patent Office. Office Action dated Oct. 14, 2005. Chinese Language. (3 pages.).

* cited by examiner

*Primary Examiner*—Burton Mullins
(74) *Attorney, Agent, or Firm*—Buchanan Ingersoll PC

(57) ABSTRACT

An armature of a rotating electric machine has a plurality of first magnetic teeth arranged side by side along a circumferential direction of the rotating electric machine and a plurality of second magnetic teeth joined to the first magnetic teeth. A pair of joint portions is formed at both end surfaces of a yoke portion of each first magnetic tooth, the joint portions formed at the facing end surfaces of the yoke portions of each successive pair of adjacent first magnetic teeth together forming a connecting part, whereas a mating part is formed at an outer end surface of each second magnetic tooth. Each second magnetic tooth is inserted between the adjacent first magnetic teeth along an axial direction of the rotating electric machine with the mating part fitted on the connecting part to interconnect the adjacent first magnetic teeth.

11 Claims, 24 Drawing Sheets

ARMATURE OF ROTATING ELECTRIC MACHINE

BACKGROUND OF THE INVENTION

1. Field of the Invention

The present invention relates generally to an armature of a rotating electric machine and, more particularly, to an improvement in production efficiency of an armature of which core is divided into multiple segments along a circumferential direction, the multiple segments being assembled together to complete the core.

2. Description of the Background Art

There exist conventionally known structures of a stator of which laminated core is divided into multiple segments along a circumferential direction of the core, wherein winding density is increased by winding coils on the individual segments of the core to achieve a size reduction and high output power of a rotating electric machine.

One example of such structures is disclosed in Japanese Patent No. 3355700, in which a laminated core is divided into units of magnetic teeth along a circumferential direction and coils are wound around the individual magnetic teeth. The magnetic teeth carrying the coils are assembled into a cylindrical form with projections and recesses alternately formed at circumferential ends of the magnetic teeth fitted together. Then, the magnetic teeth are fixedly joined by welding their fitted ends along a core-laminating direction by using a laser welding machine.

Another example is disclosed in Japanese Laid-open Patent Publication No. 1998-174319, in which a laminated core is also divided into units of magnetic teeth along a circumferential direction and coils are wound around the individual magnetic teeth. In the structure of this Publication, the magnetic teeth carrying the coils are assembled into a cylindrical form with a projection formed at a circumferential end of each magnetic tooth fitted into a recess formed in a facing circumferential end of the adjacent magnetic tooth. An outer extending part of the recess of each magnetic tooth is caulked inward to fixedly join the individual magnetic teeth.

Conventional armatures of rotating electric machines produced by assembling a plurality of separately manufactured magnetic teeth to achieve a high winding density require a process of laser welding or caulking for joining together the individual magnetic teeth as stated above with reference to Japanese Patent No. 3355700 and Japanese Laid-open Patent Publication No. 1998-174319. Since this special and tedious teeth-joining process needs to be performed as many times as the number of the magnetic teeth, the aforementioned conventional structures have been associated with a problem of poor productivity.

The structure of Japanese Patent No. 3355700 requires an expensive laser welding machine for joining the magnetic teeth. In addition, the laser welding machine produces heat which could cause deformation of an armature and a consequent deterioration of properties of a rotating electric machine, such as cogging and torque ripples.

On the other hand, the structure of Japanese Laid-open Patent Publication No. 1998-174319 requires a dedicated caulking machine. The caulking process could also cause deformation of an armature and a consequent deterioration of properties of a rotating electric machine, such as cogging and torque ripples.

SUMMARY OF THE INVENTION

In view of the foregoing, it is an object of the invention to provide an armature of a rotating electric machine which makes it possible to overcome the aforementioned problems of the prior art. It is a more specific object of the invention to provide an armature which can be produced with an improved efficiency requiring a reduced number of manufacturing steps in a process of assembling magnetic teeth and will neither deform as a result of teeth-joining process nor cause deterioration of properties of a rotating electric machine due to deformation of the armature.

In one principal form of the invention, an armature of a rotating electric machine includes a plurality of first magnetic teeth arranged side by side along a circumferential direction of the rotating electric machine, each of the first magnetic teeth having a yoke portion extending along the circumferential direction and a tooth portion extending from a central part of the yoke portion inward along a radial direction of the rotating electric machine, and a plurality of second magnetic teeth, each located between the tooth portions of each successive pair of adjacent first magnetic teeth, and each of the second magnetic teeth joining two adjacent first magnetic teeth located on both sides.

In another principal form of the invention, an armature of a rotating electric machine includes a plurality of first magnetic teeth arranged side by side along a circumferential direction of the rotating electric machine, and a plurality of second magnetic teeth joined to the first magnetic teeth. In this armature of the rotating electric machine, each of the first magnetic teeth has a yoke portion extending along the circumferential direction, a tooth portion extending from a central part of the yoke portion inward along a radial direction of the rotating electric machine, and a pair of joint portions formed along inner edges of both end surfaces of the yoke portion, the joint portions formed at the facing end surfaces of the yoke portions of each successive pair of adjacent first magnetic teeth together forming a connecting part. Also, each of the second magnetic teeth extends along the radial direction with a mating part formed at an outer end surface of each second magnetic tooth. The second magnetic teeth are joined to the first magnetic teeth by fitting the connecting parts to the respective mating parts.

The armatures of the invention thus structured are useful either as a stator or as a rotor of a rotating electric machine such as a motor.

Other features and advantages of the present invention will be more readily understood from the following detailed description of specific embodiments thereof and accompanying drawings.

DESCRIPTION OF THE PREFERRED EMBODIMENTS

First Embodiment

Figure 1:
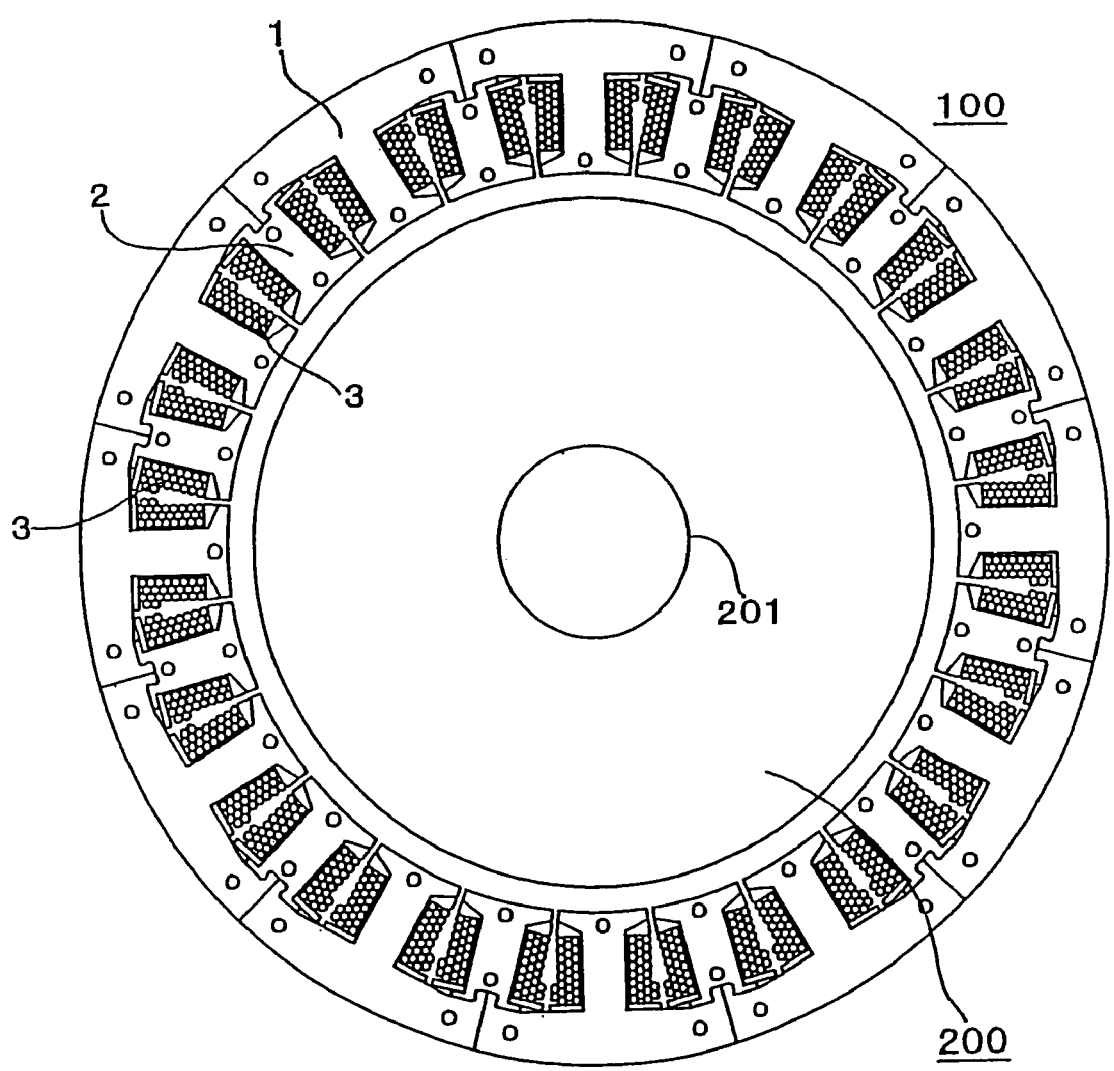
FIG. 1 is a plan view of an armature of a rotating electric machine according to a first embodiment of the invention.

FIG. 1 is a plan view showing an armature 100 of a rotating electric machine according to a first embodiment of the invention. Here, the invention is described, by way of example, with reference to the rotating electric machine in which the armature 100 functions as a stator (stationary armature) disposed around a rotor 200 which is integrally mounted on a rotary shaft 201, the armature 100 facing the rotor 200 with a specific gap therebetween. It will be recognized from the following description that the invention is fully applicable in a similar way even when the armature is a rotor (rotating armature) integrally mounted on a rotary shaft.

The armature 100 includes a plurality of first magnetic teeth 1 arranged side by side along a circumferential direction of the rotating electric machine, a plurality of second magnetic teeth 2 joined to the first magnetic teeth 1, and coils 3 wound on both the first magnetic teeth 1 and the second magnetic teeth 2 as shown in FIG. 1. Each of the second magnetic teeth 2 interconnects two first magnetic teeth 1 located on both sides as illustrated.

Figure 2:
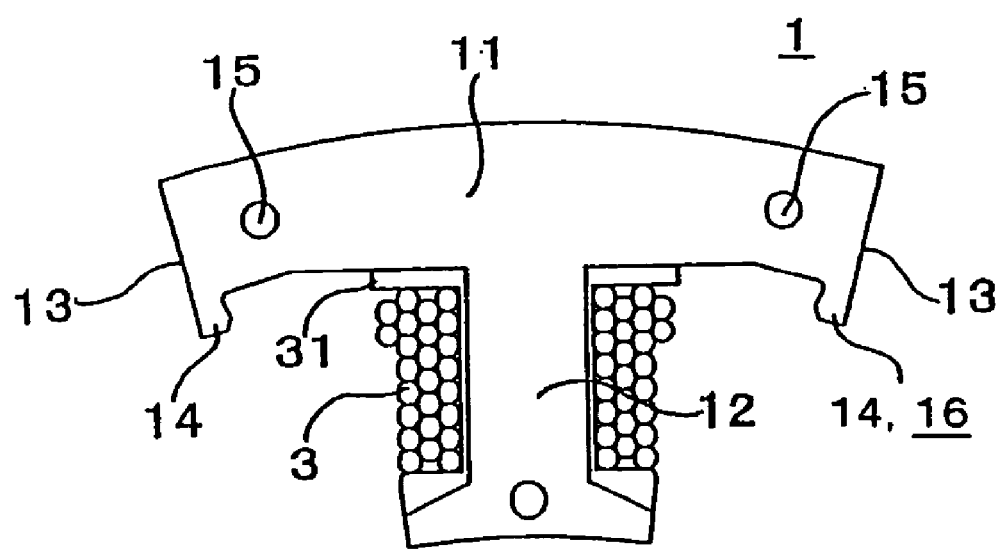
FIG. 2 is a plan view of a first magnetic tooth of the armature of FIG. 1.
Figure 3:
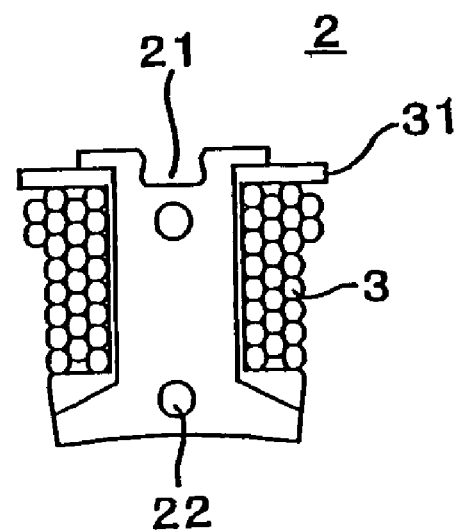
FIG. 3 is a plan view of a second magnetic tooth of the armature of FIG. 1.

FIG. 2 is a plan view showing one of the first magnetic teeth 1 of FIG. 1, and FIG. 3 is a plan view showing one of the second magnetic teeth 2 of FIG. 1. Referring to FIG. 2, the first magnetic tooth 1 has a yoke portion 11 extending along the circumferential direction and a tooth portion 12 extending from a central part of the yoke portion 11 inward along a radial direction of the rotating electric machine. The coil 3 is wound around the tooth portion 12 of each first magnetic tooth 1 with an insulator 31 placed between the tooth portion 12 and the coil 3. There are formed protruding joint portions 14 along inner edges (lower edges as illustrated in FIG. 2) of both end surfaces 13 of each yoke portion 11. The joint portions 14 thus formed fit into later-described groovelike mating parts 21 formed in the second magnetic teeth 2. Each of the first magnetic teeth 1 is formed by stacking a specific number of steel sheets, each having a shape shown in FIG. 2, and punching caulking holes 15 through the stacked steel sheets so that protruding edges raised around the caulking holes 15 punched in the successive steel sheets become engaged with one another, thereby joining the steel sheets into a single structure.

Formed in an outer end surface (upper end surface as illustrated in FIG. 3) of each second magnetic tooth 2, the aforementioned mating part 21 has a dovetail groove-shaped cross section as illustrated in FIG. 3. Each of the second magnetic teeth 2 performs by itself the same function as the tooth portion 12 of the first magnetic tooth 1. When two first magnetic teeth 1 are arranged side by side along the circumferential direction with their facing end surfaces 13 positioned directly against each other, the joint portions 14 of each successive pair of adjacent first magnetic teeth 1 together form a protruding raillike connecting part 16 which fits into the mating part 21 formed in the second magnetic tooth 2. As the second magnetic teeth 2 fit on the connecting part 16 formed by each successive pair of adjacent first magnetic teeth 1 in this manner, the first magnetic teeth 1 are connected together as shown in FIG. 1. As is the case with the first magnetic teeth 1, each of the second magnetic teeth 2 is formed by stacking a specific number of steel sheets, each having a shape shown in FIG. 3, and punching caulking holes 22 through the stacked steel sheets to join the steel sheets into a single structure.

A procedure to be followed when assembling the armature 100 is now described. First, the insulators 31 are fitted on the first magnetic teeth 1 and the second magnetic teeth 2 which have been formed into the shapes shown in FIGS. 2 and 3, respectively, and the coils 3 are wound around the individual first and second magnetic teeth 1, 2. Since the coils 3 are individually wound on each piece of the magnetic teeth 1, 2, it is possible to achieve a high winding density.

Figure 4:
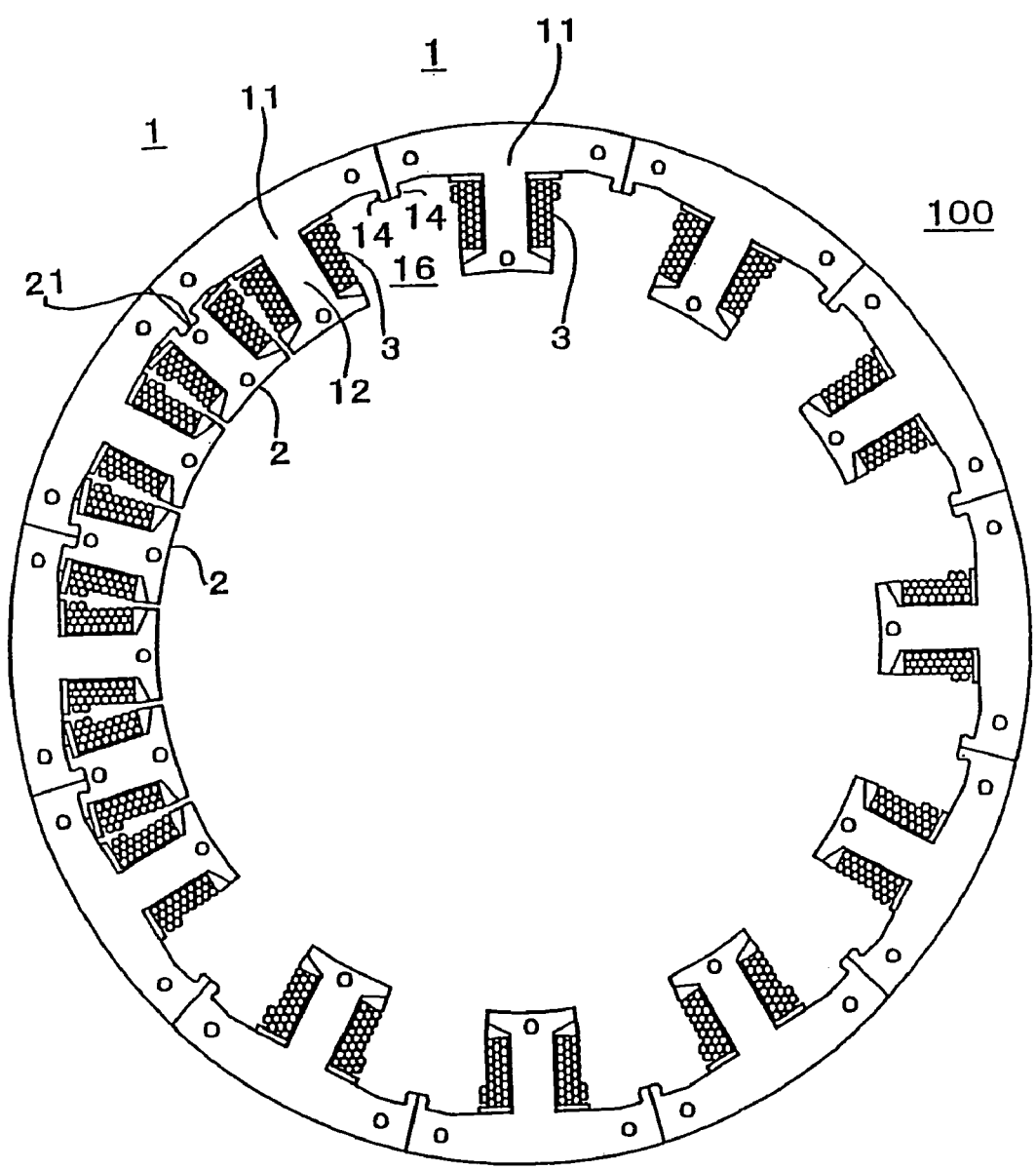
FIG. 4 is a diagram showing how the armature of FIG. 1 is assembled.

Next, the first magnetic teeth 1 on which the coils 3 have been wound are arranged in a cylindrical form as shown in FIG. 4 such that the end surfaces 13 of the successive first magnetic teeth 1 are positioned face to face with one another. As the end surfaces 13 of the successive first magnetic teeth 1 are placed in mutual contact in this way, the joint portions 14 formed along the end surfaces 13 of each successive pair of adjacent first magnetic teeth 1 together form the connecting part 16 as illustrated in detail in FIGS. 5A and 5B.

The second magnetic teeth 2 on which the coils 3 have been wound are then inserted between the adjacent first magnetic teeth 1 along an axial direction of the rotating electric machine (or a direction perpendicular to the page of FIG. 4) such that the mating parts 21 of the individual second magnetic teeth 2 fit over the connecting parts 16 formed between the successive first magnetic teeth 1. When the second magnetic teeth 2 are joined to the first magnetic teeth 1 with the mating parts 21 fitted on the connecting parts 16 in this fashion, the adjacent first magnetic teeth 1 are also joined with one another.

Since the armature 100 of the rotating electric machine of the first embodiment of the invention is constructed as described above, it is possible to wind the coils 3 at a high winding density around the individual magnetic teeth 1, 2 to produce high-capacity windings. It is also possible to improve production efficiency because the number of manufacturing steps needed for assembling the magnetic teeth 1, 2 are reduced by roughly half compared to the manufacture of the earlier-described conventional armatures.

According to the present embodiment, the first magnetic teeth 1 and the second magnetic teeth 2 are joined by just fitting the mating parts 21 having the dovetail groove-shaped cross section on the connecting parts 16, and when the first and second magnetic teeth 1, 2 are joined together in this way, the adjacent first magnetic teeth 1 are also joined with one another. Thus, the armature 100 of the embodiment can be assembled without the need for an expensive laser welding machine or a dedicated caulking machine unlike the conventional armatures and, as a consequence, deterioration of properties of the rotating electric machine would not occur due to deformation of the armature 100 during its teeth-joining process.

While the first and second magnetic teeth 1, 2 are both formed by laminating steel sheets into single structures in the first embodiment described above, the invention is not limited to this construction. Even when first and second magnetic teeth are formed by sintering or injection-molding a magnetic powder material or by other methods, the invention is applicable to the manufacture of armatures generally in the same way as the present embodiment in which the first and second magnetic teeth 1, 2 are formed of the laminated steel sheets. Although not specifically mentioned in the following discussion, such alternative methods of manufacturing first and second magnetic teeth may be applied not only to the first embodiment but also to other embodiments discussed hereinafter.

Second Embodiment

Figure 5A:
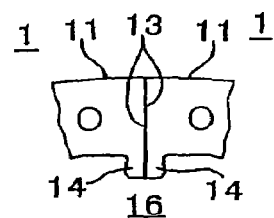
FIGS. 5A and 5B are enlarged diagrams particularly showing a joint portion of a pair of adjacent first magnetic teeth.
Figure 5B:
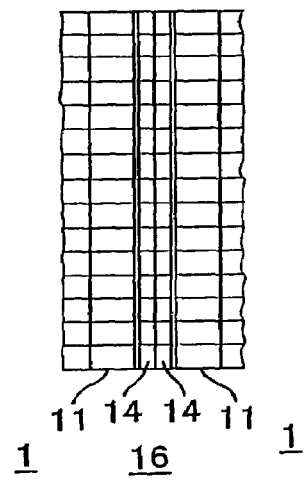
Figure 6A:
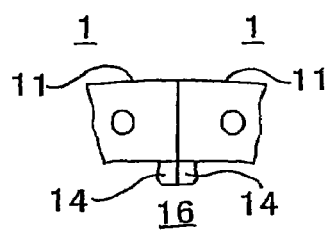
FIGS. 6A and 6B are diagrams showing a principal portion of an armature of a rotating electric machine according to a second embodiment of the invention.
Figure 6B:
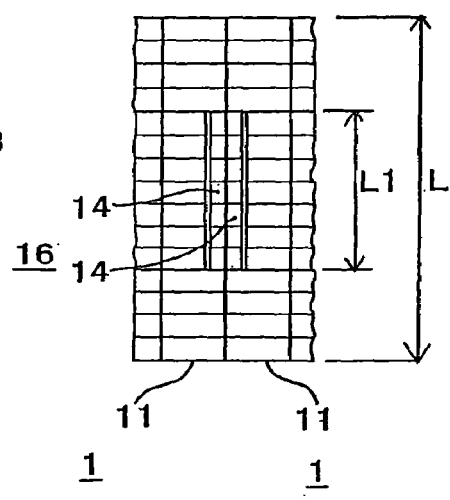

FIGS. 6A and 6B are diagrams showing a principal portion of an armature of a rotating electric machine according to a second embodiment of the invention, FIGS. 6A and 6B corresponding to FIGS. 5A and 5B showing the first embodiment of the invention.

In the second embodiment of the invention, joint portions 14 formed along facing end surfaces 13 of yoke portions 11 of each pair of adjacent first magnetic teeth 1 do not extend all the way along the entire length L (as measured along the axial direction) of the first magnetic teeth 1 but along part of the entire length L, or length L1. While each connecting part 16 made of a pair of joint portions 14 extends to the length L1 as illustrated, a mating part 21 having a dovetail groove-shaped cross section is formed along the entire axial length L of each second magnetic tooth 2.

In this embodiment, the connecting part 16 is made shorter than the entire axial length L of the first magnetic teeth 1 as explained above. This construction of the embodiment is advantageous in that each of the second magnetic teeth 2 can be inserted between the adjacent first magnetic teeth 1 along the axial direction with increased ease of handling with the mating part 21 easily fitted on the connecting part 16.

Third Embodiment

Figure 7:
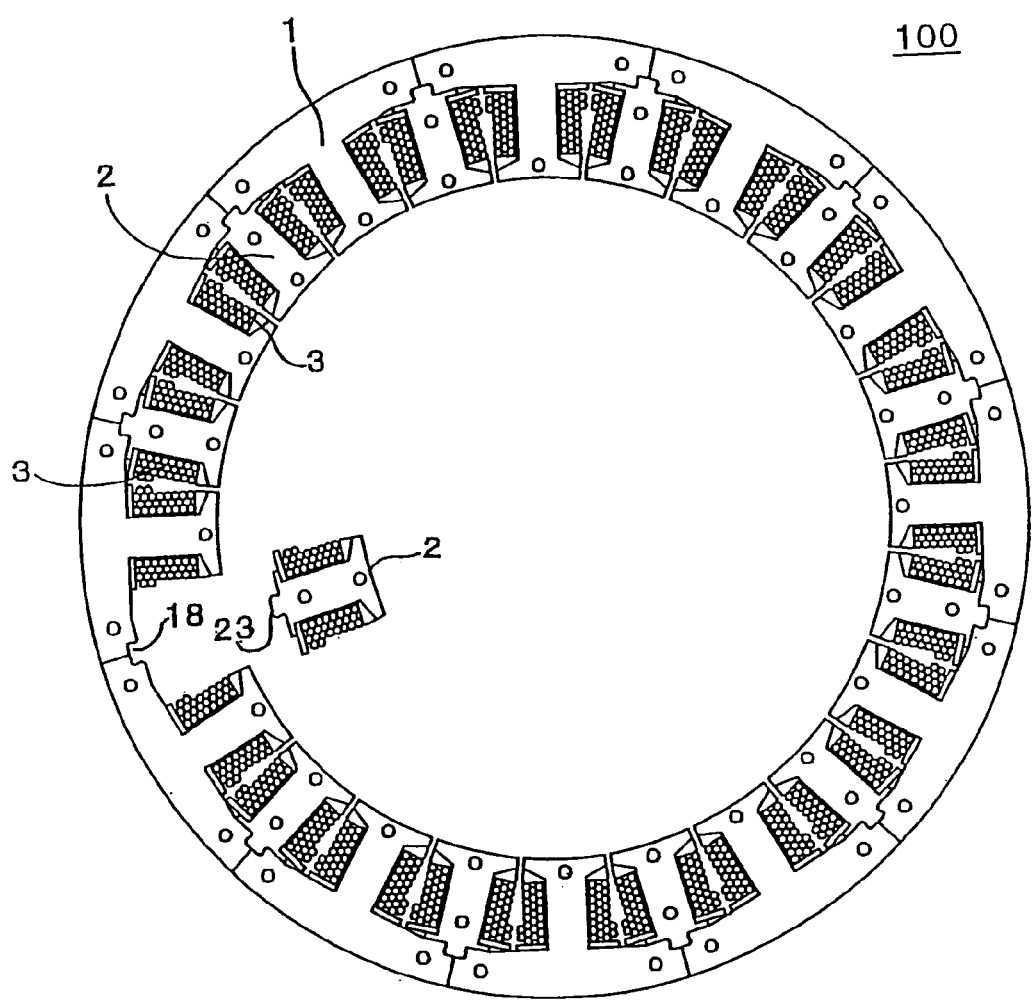
FIG. 7 is a plan view of an armature of a rotating electric machine according to a third embodiment of the invention.
Figure 8:
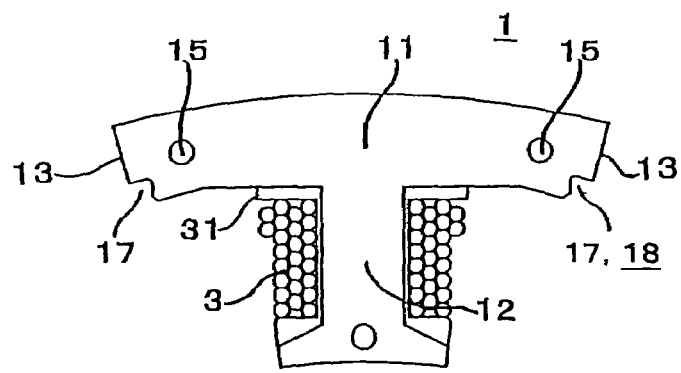
FIG. 8 is a plan view of a first magnetic tooth of the armature of FIG. 7.
Figure 9:
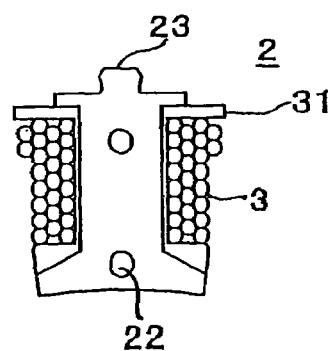
FIG. 9 is a plan view of a second magnetic tooth of the armature of FIG. 7.

FIG. 7 is a plan view showing an armature 100 of a rotating electric machine according to a third embodiment of the invention, FIG. 8 is a plan view showing one of first magnetic teeth 1 of FIG. 7, and FIG. 9 is a plan view showing one of second magnetic teeth 2 of FIG. 7. The following discussion deals mainly with how the armature 100 of the third embodiment differs from the armature 100 of the first embodiment, in which elements identical or similar to those of the first embodiment are designated by the same reference numerals.

Referring to the Figures, there are formed groovelike joint portions 17 along inner edges (lower edges as illustrated in FIG. 8) of both end surfaces 13 of a yoke portion 11 of each first magnetic tooth 1. When two first magnetic teeth 1 are arranged side by side along the circumferential direction with their end surfaces 13 positioned directly against each other, the groovelike joint portions 17 of the two adjacent first magnetic teeth 1 face each other, together forming a connecting part 18 having a dovetail groove-shaped cross section. The joint portions 17 of this embodiment are recesses formed in the yoke portion 11 of each first magnetic tooth 1. This construction of the third embodiment is advantageous in that coils 3 can be smoothly wound around tooth portions 12 of the individual first magnetic teeth 1, because there exist no other protruding parts on the yoke portions 11 unlike the first embodiment.

On the other hand, there is formed a protruding raillike mating part 23 on an outer end surface of each second magnetic tooth 2 as shown in FIG. 9. This protruding mating part 23 fits into the dovetail groove-shaped connecting part 18 formed between the adjacent first magnetic teeth 1.

The first magnetic teeth 1 and the second magnetic teeth 2 of the third embodiment are assembled in the following manner. First, the first magnetic teeth 1 on which the coils 3 have been wound are arranged in a cylindrical form as shown in FIG. 7 in such a manner that the end surfaces 13 of the successive first magnetic teeth 1 are positioned face to face with one another. Although not illustrated, there is disposed an external frame along an outer periphery of the first magnetic teeth 1 arranged in the cylindrical form. The individual first magnetic teeth 1 are securely held in the cylindrical form by this outside frame. As the end surfaces 13 of the successive first magnetic teeth 1 are placed in mutual contact in this way, the joint portions 17 formed along the end surfaces 13 of each successive pair of adjacent first magnetic teeth 1 together form the connecting part 18 having the dovetail groove-shaped cross section.

Next, the second magnetic teeth 2 on which the coils 3 have been wound are inserted between the adjacent first magnetic teeth 1 along the axial direction such that the mating parts 23 of the individual second magnetic teeth 2 fit in the connecting parts 18 formed between the successive first magnetic teeth 1. Consequently, the first magnetic teeth 1 and the second magnetic teeth 2 are joined, together forming a single structure.

Since the armature 100 of the rotating electric machine of the third embodiment of the invention is constructed as described above, it is possible to wind the coils 3 at a high winding density around the individual magnetic teeth 1, 2 to produce high-capacity windings. It is also possible to improve production efficiency because the number of manufacturing steps needed for assembling the magnetic teeth 1, 2 are reduced by roughly half compared to the manufacture of the earlier-described conventional armatures.

According to the present embodiment, the first magnetic teeth 1 and the second magnetic teeth 2 are joined by just fitting the protruding mating parts 23 into the connecting parts 18 having the dovetail groove-shaped cross section. Thus, the armature 100 of the embodiment can be assembled without the need for an expensive laser welding machine or a dedicated caulking machine unlike the conventional armatures and, as a consequence, deterioration of properties of the rotating electric machine would not occur due to deformation of the armature 100 during its teeth-joining process.

Figure 10A:
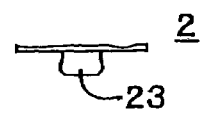
FIGS. 10A and 10B are diagrams showing a varied form of the second magnetic tooth of the third embodiment.
Figure 10B:
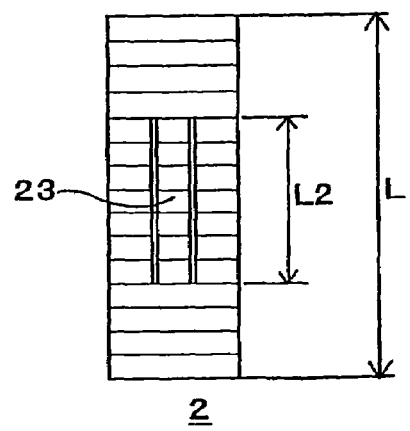

In one varied form of this embodiment, the protruding mating part 23 formed on the outer end surface of each second magnetic tooth 2 may extend along only part (length L2) of the entire length L (as measured along the axial direction) of the second magnetic tooth 2 as illustrated in FIGS. 10A and 10B. As previously explained with reference to the second embodiment, this varied form of the third embodiment is advantageous in that each of the second magnetic teeth 2 can be inserted between the adjacent first magnetic teeth 1 along the axial direction with increased ease of handling with the mating part 23 easily fitted in the connecting part 18.

Fourth Embodiment

Figure 11:
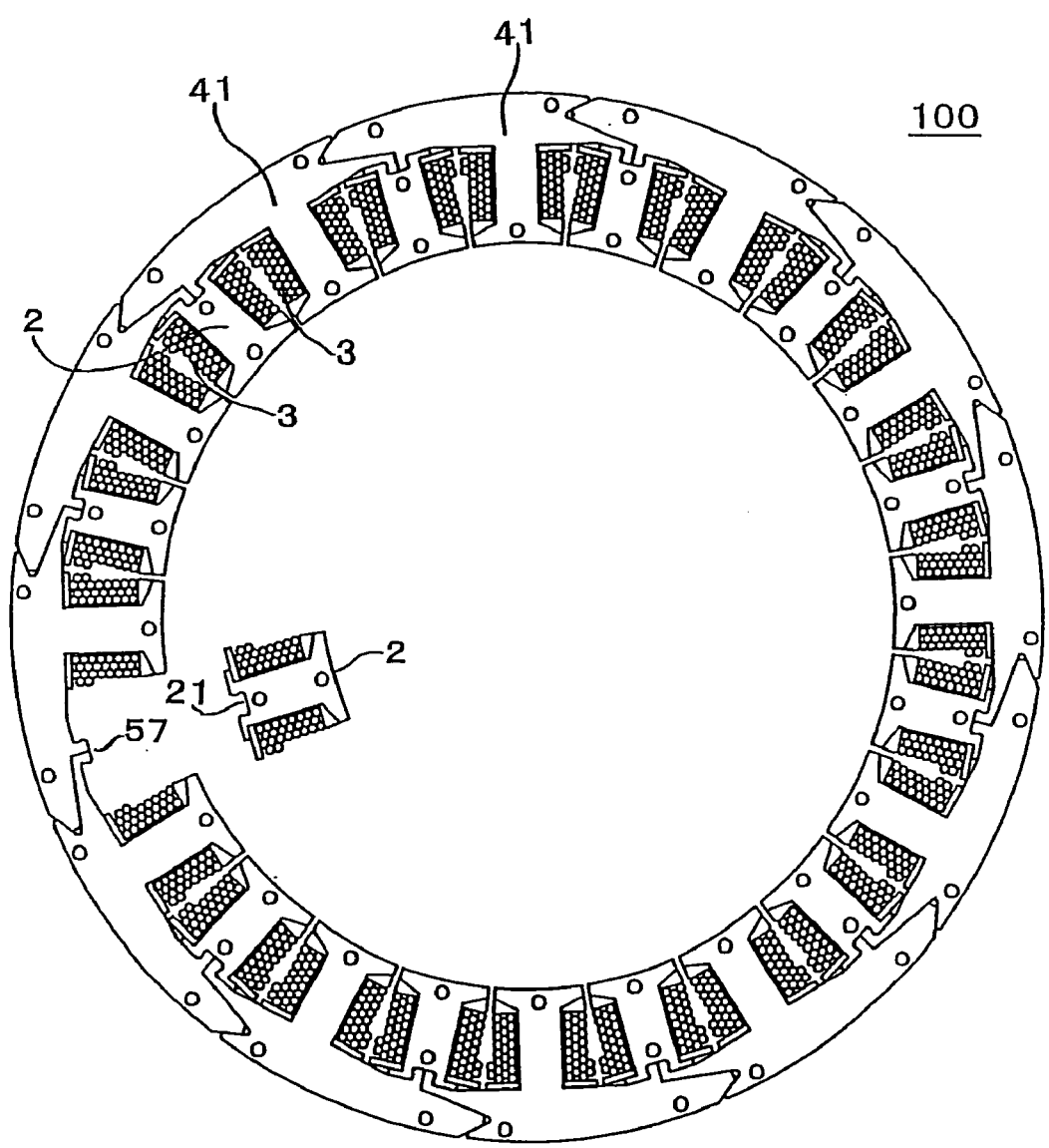
FIG. 11 is a plan view showing an armature of a rotating electric machine according to a fourth embodiment of the invention.
Figure 12:
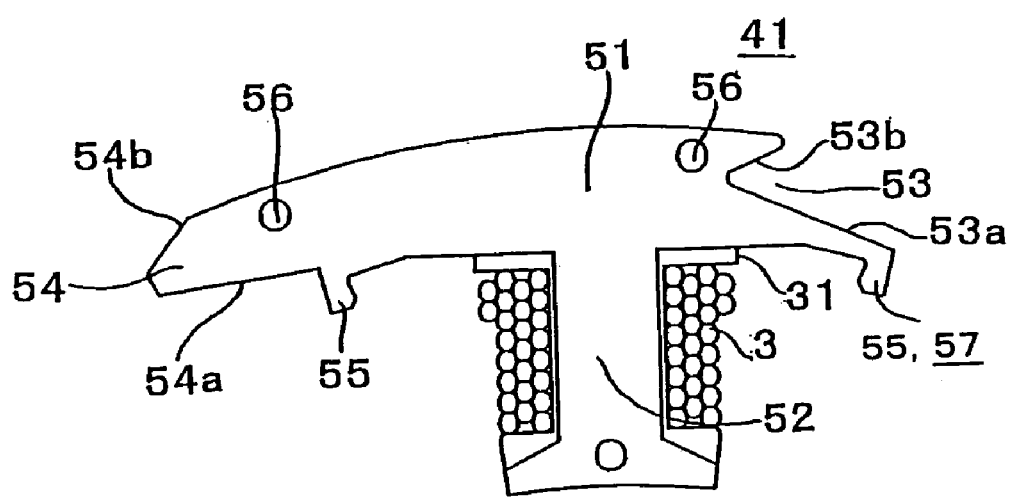
FIG. 12 is a plan view of a first magnetic tooth of FIG. 11.
Figure 13:
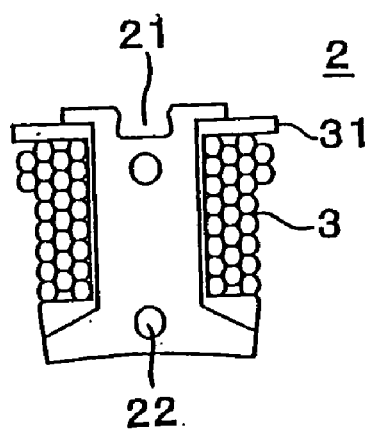
FIG. 13 is a plan view of a second magnetic tooth of FIG. 11.

FIG. 11 is a plan view showing an armature 100 of a rotating electric machine according to a fourth embodiment of the invention, FIG. 12 is a plan view showing one of first magnetic teeth 41 of FIG. 11, and FIG. 13 is a plan view showing one of second magnetic teeth 2 of FIG. 11, in which elements identical or similar to those of the first embodiment are designated by the same reference numerals. The second magnetic tooth 2 of the fourth embodiment shown in FIG. 13 is exactly the same as the second magnetic tooth 2 of the first embodiment (FIG. 3), so that the following discussion deals mainly with the first magnetic teeth 41.

Referring to FIG. 12, each of the first magnetic teeth 41 has a yoke portion 51 extending along the circumferential direction and a tooth portion 52 extending from a central part of the yoke portion 51 inward along a radial direction of the rotating electric machine. A coil 3 is wound around the tooth portion 52 of each first magnetic tooth 41 with an insulator 31 placed between the tooth portion 52 and the coil 3. There is formed a pair of protruding joint portions 55 on an inner surface (lower surface as illustrated in FIG. 12) of the yoke portion 51 of each first magnetic tooth 41. When two first magnetic teeth 41 are arranged adjacent to each other along the circumferential direction, the joint portion 55 of one first magnetic tooth 41 and the joint portion 55 of the other first magnetic tooth 41 together form a connecting part 57 (FIG. 11) which fits into the groovelike mating part 21 formed in the outer end surface of each second magnetic tooth 2.

At one end (right end as illustrated in FIG. 12) of the yoke portion 51 of each first magnetic tooth 41, there is formed a recessed portion 53 flanked by a gently inclined slant surface 53a and an oppositely inclined slant surface 53b. At the other end (left end as illustrated in FIG. 12) of the yoke portion 51 of each first magnetic tooth 41, there is formed a projecting portion 54 having slant surfaces 54a and 54b. When the first magnetic teeth 41 are arranged in a cylindrical form as shown in FIG. 11, the slant surfaces 54a, 54b of projecting portion 54 of each first magnetic tooth 41 come in contact with the slant surfaces 53a, 53b of recessed portion 53 of the adjacent first magnetic tooth 41.

When the first magnetic teeth 41 are arranged in the cylindrical form as stated above, the joint portions 55 formed on each successive pair of adjacent first magnetic teeth 41 come in contact with each other, together forming the connecting part 57. The connecting parts 57 thus formed are fitted into the mating parts 21 formed in the individual second magnetic teeth 2, whereby the second magnetic teeth 2 are joined to the first magnetic teeth 41.

The fourth embodiment offers the following advantages in addition to the earlier-mentioned advantageous effects of the first embodiment.

When joining the second magnetic teeth 2 to the first magnetic teeth 41 arranged in the cylindrical form, there may be produced a force which would cause the first magnetic teeth 41 to swell radially outward as a result of the teeth-joining process. The aforementioned construction of the fourth embodiment produces an effect of preventing such outward swelling, or radial displacement, of the first magnetic teeth 41. This is because the recessed portions 53 and the projecting portions 54 of the adjacent first magnetic teeth 41 are fitted to one another, and this serves to retain the individual first magnetic teeth 41 at a fixed radial position and avoid outward deformation of the first magnetic teeth 41. Overall, the construction of the embodiment makes it possible to manufacture armatures with high accuracy.

Also, the construction of the embodiment makes it possible to suppress an increase in reluctance potentially caused by dividing a core into multiple magnetic teeth along the circumferential direction. This is because the adjacent first magnetic teeth 41 are joined to one another with a larger joint surface area due to the provision of the recessed portion 53 having the gently inclined slant surfaces 53a, 53b and the projecting portion 54 having the slant surfaces 54a, 54b at opposite ends of each first magnetic tooth 41.

Fifth Embodiment

Figure 14:
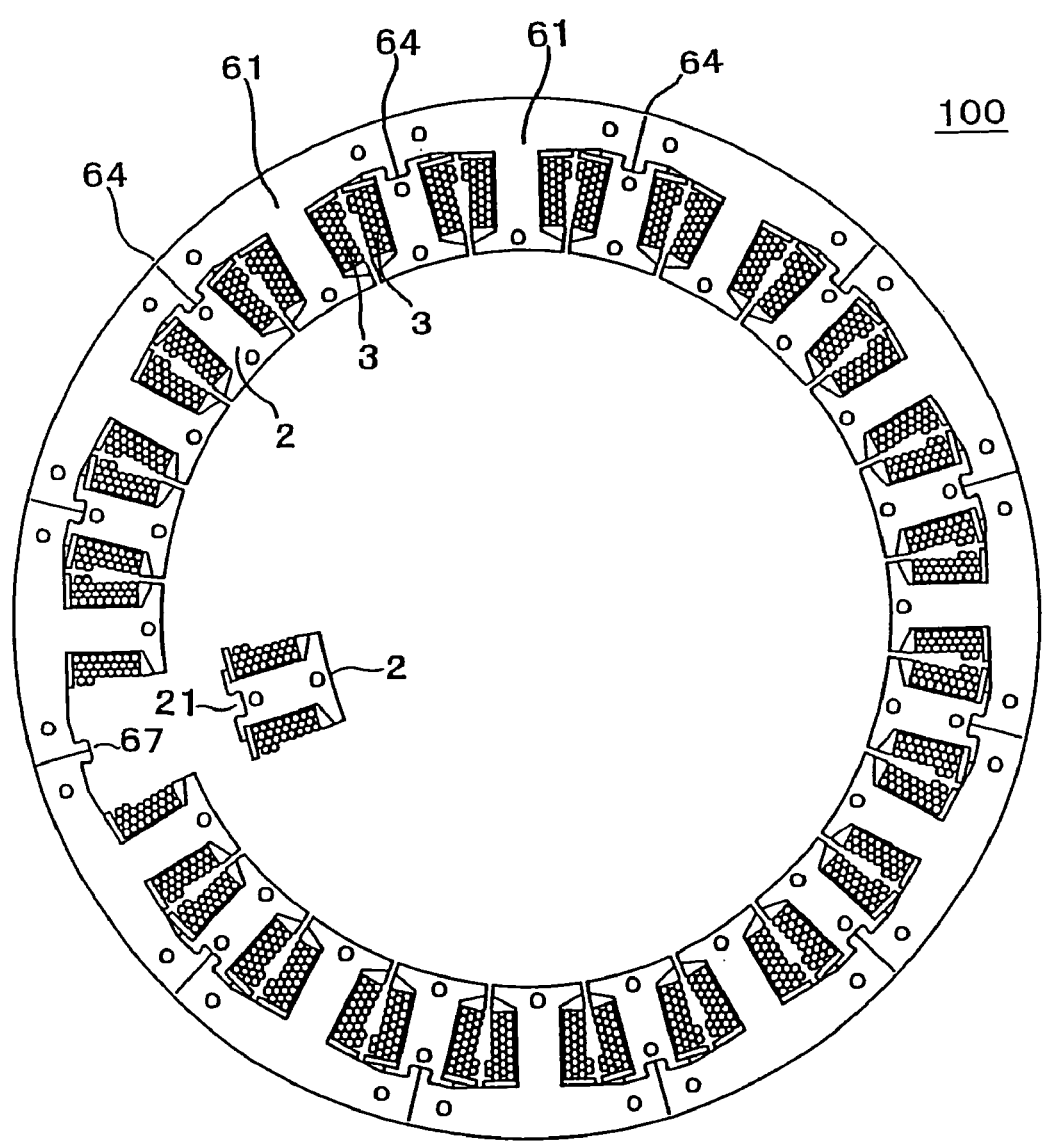
FIG. 14 is a plan view showing an armature of a rotating electric machine according to a fifth embodiment of the invention.
Figures 15A, 15B:
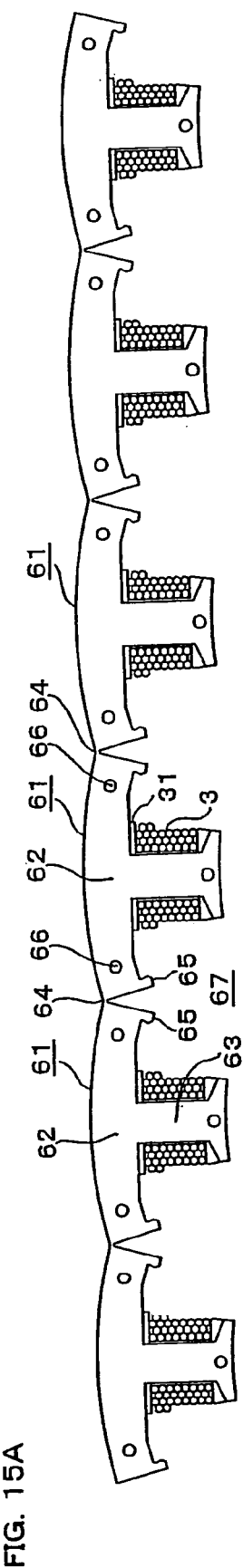
FIGS. 15A and 15B are diagrams showing a plurality of first magnetic teeth and a second magnetic tooth of the armature of FIG. 14, respectively.

FIG. 14 is a plan view showing an armature 100 of a rotating electric machine according to a fifth embodiment of the invention, FIG. 15A is a plan view showing a plurality of first magnetic teeth 61 which are joined together, and FIG. 15B is a plan view showing one of second magnetic teeth 2 of FIG. 14, in which elements identical or similar to those of the first embodiment are designated by the same reference numerals. While the first magnetic teeth 1 (41) of the aforementioned first to fourth embodiments are produced as discrete elements, the first magnetic teeth 61 of the fifth embodiment are linked together by flexible joints 64 like a chain. The second magnetic tooth 2 of the fifth embodiment shown in FIG. 15B is exactly the same as the second magnetic tooth 2 of the first embodiment (FIG. 3).

Referring to FIG. 15A, each of the first magnetic teeth 61 has a yoke portion 62 and a tooth portion 63. A coil 3 is wound around the tooth portion 63 of each first magnetic tooth 61 with an insulator 31 placed between the tooth portion 63 and the coil 3.

The individual first magnetic teeth 61 are connected one after another by the aforementioned flexible joints 64 which join an outer edge (upper edge as illustrated in FIG. 15A) of an circumferential end of the yoke portion 62 of each first magnetic tooth 61 to a corresponding part of the yoke portion 62 of the adjacent first magnetic tooth 61. There is formed a pair of protruding joint portions 65 along inner edges (lower edges as illustrated in FIG. 15A) of both end surfaces of the yoke portion 62 of each first magnetic tooth 61 as in the first magnetic teeth 1 of the fifth embodiment. When the first magnetic teeth 61 are arranged in a cylindrical form by bending the flexible joints 64 as shown in FIG. 14, the joint portions 65 of each successive pair of adjacent first magnetic teeth 61 together form a protruding raillike connecting part 67.

The first magnetic teeth 61 are formed by stacking steel sheets and punching caulking holes 66 through the stacked steel sheets to join the steel sheets into a single structure.

A procedure to be carried out when assembling the armature 100 is as follows. With the first magnetic teeth 61 stretched to form a straight string as shown in FIG. 15A, the insulators 31 are fitted on the individual tooth portions 63 and the coils 3 are wound around the insulators 31. The fifth embodiment helps improve production efficiency because the aforementioned construction of the embodiment makes it possible to continuously wind the coils 3 on the first magnetic teeth 61. Needless to mention, the coils 3 can be wound at a high winding density on the first magnetic teeth 61 to produce high-capacity windings as in the foregoing embodiments in which the coils 3 are individually wound around the separate first magnetic teeth 1 (41). This is because the tooth portions 63 are positioned at intervals approximately twice as large as final tooth-to-tooth intervals, providing a sufficient space around each tooth portion 63 for performing coil-winding operation, when the string of the first magnetic teeth 61 is stretched in a straight form (FIG. 15A).

The string of the first magnetic teeth 61 carrying the coils 3 wound on the tooth portions 63 is bent at the flexible joints 64 to shape the first magnetic teeth 61 into a cylindrical form as shown in FIG. 14. The second magnetic teeth 2 on which the coils 3 have been wound are then inserted between the adjacent first magnetic teeth 61 along the axial direction of the rotating electric machine such that the mating parts 21 of the individual second magnetic teeth 2 fit over the connecting parts 67 formed between the successive first magnetic teeth 61. Consequently, the first magnetic teeth 61 and the second magnetic teeth 2 are joined, together forming a single structure.

Another advantage of the fifth embodiment is increased ease of handling of the first magnetic teeth 61, as the individual first magnetic teeth 61 are linked together by the flexible joints 64 in a bendable form.

Sixth Embodiment

Figure 16:
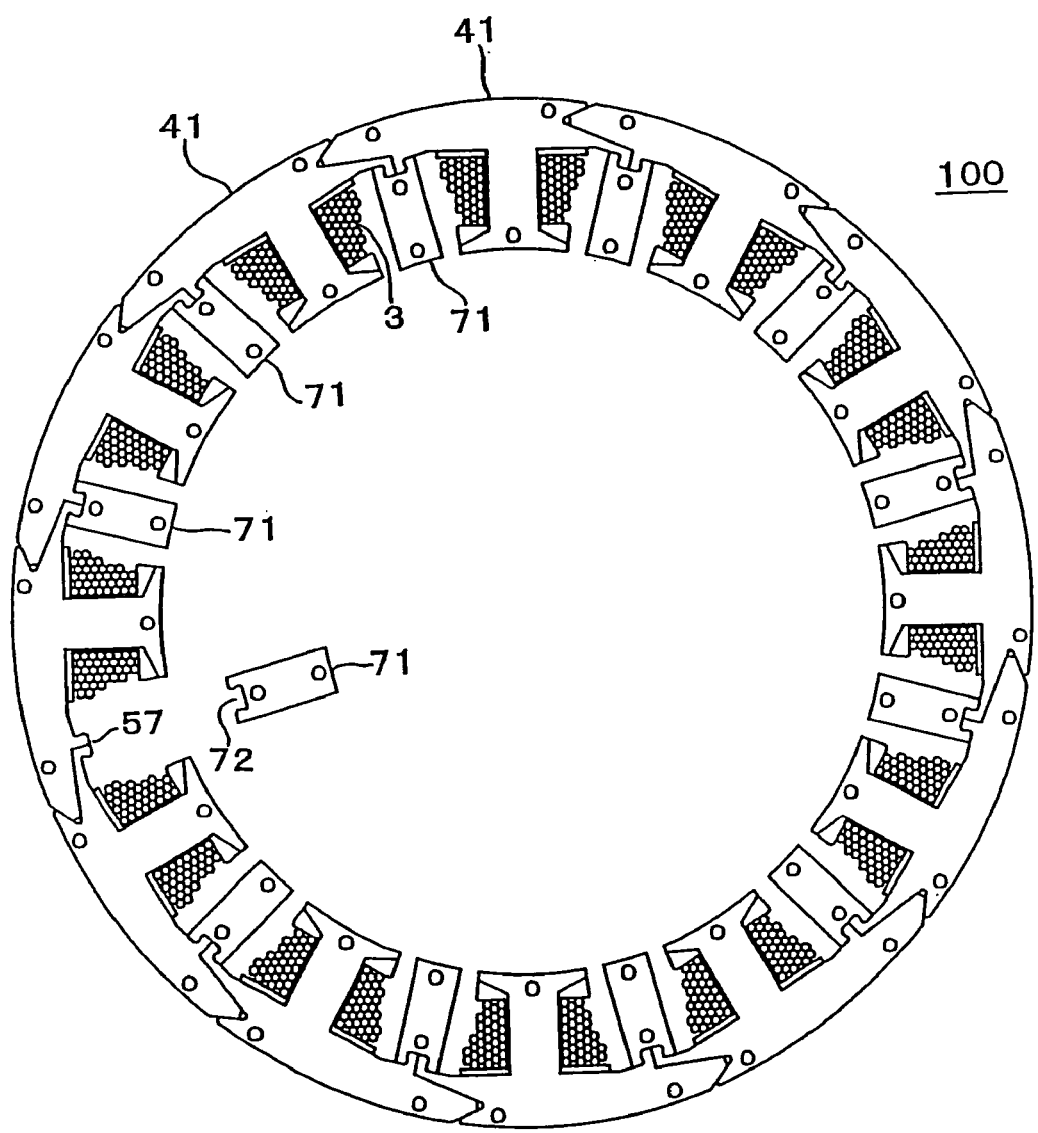
FIG. 16 is a plan view showing an armature of a rotating electric machine according to a sixth embodiment of the invention.

FIG. 16 is a plan view showing an armature 100 of a rotating electric machine according to a sixth embodiment of the invention. The armature 100 of the sixth embodiment is characterized in that auxiliary teeth 71 are used instead of the second magnetic teeth 2 of the fourth embodiment to fixedly join individual first magnetic teeth 41 to one another. In the present embodiment, the first magnetic teeth 41 function as main teeth while the auxiliary teeth 71 perform a function of suppressing cogging torque and torque ripples.

Figure 17:
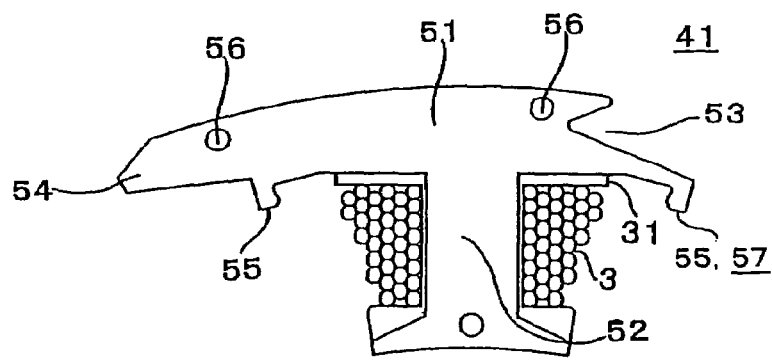
FIG. 17 is a plan view of a first magnetic tooth of FIG. 16.
Figure 18A:
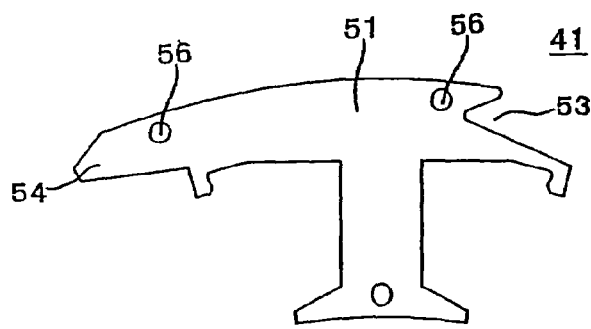
FIGS. 18A, 18B, 18C and 18D are diagrams showing a first magnetic tooth and an auxiliary tooth of FIG. 16.
Figure 18C:
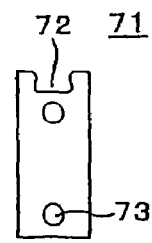
Figure 18B:
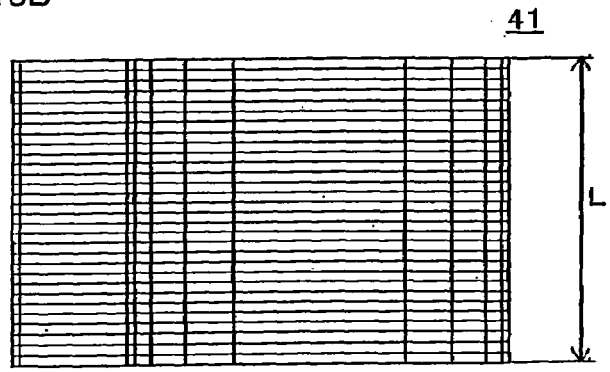

Shown in FIG. 17 is one of the first magnetic teeth 41 serving as main teeth. Since the first magnetic tooth 41 of this embodiment has exactly the same structure as that of the fourth embodiment, there is not provided a description of the first magnetic tooth 41 here. FIGS. 18A, 18B, 18C and 18D are plan views and side views showing the first magnetic tooth 41 and the auxiliary tooth 71. Referring to FIG. 18C, each of the auxiliary teeth 71 is formed by stacking a specific number of steel sheets and punching caulking holes 73 through the stacked steel sheets to join the steel sheets into a single structure. There is formed a groovelike mating part 72 in an outer end surface (upper end surface as illustrated in FIG. 18C) of each auxiliary tooth 71. The groovelike mating parts 72 formed in the auxiliary teeth 71 are fitted on the corresponding connecting parts 57, each of which is formed by a pair of protruding joint portions 55 when the first magnetic teeth 41 are arranged in a cylindrical form as shown in FIG. 16. Consequently, the first magnetic teeth 41 and the auxiliary teeth 71 are joined, together forming a single structure.

Figure 18D:
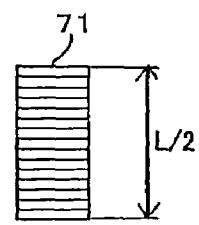

Since no coils are wound on the auxiliary teeth 71 in this embodiment, the auxiliary tooth 71 may be formed by combining a pair of individually produced tooth segments each having half the entire length L of the auxiliary tooth 71, for example, as shown in FIG. 18D. If each auxiliary tooth 71 is formed by arranging two such tooth segments having a shorter length L/2 in series, the auxiliary teeth 71 can be fitted by inserting the tooth segments each having half the entire length L. This construction of the embodiment makes it possible to facilitate the teeth-joining process which is performed by fitting the mating parts 72 on the respective connecting parts 57.

While the first magnetic teeth 41 serve as main teeth on which the coils 3 are wound and the auxiliary teeth 71 on which no coils are wound are used for joining the successive first magnetic teeth 41 in the sixth embodiment, this construction of the embodiment may be modified in such a way that the first magnetic teeth 41 serve as auxiliary teeth on which no coils are wound and second magnetic teeth 2 (refer to FIG. 13) on which the coils 3 are wound are inserted between the successive first magnetic teeth 41 to join the first magnetic teeth 41 to one another.

Furthermore, although the first magnetic teeth 41 each have the recessed portion 53 and the projecting portion 54 at opposite ends of the yoke portion 51 in the above-described sixth embodiment, first magnetic teeth having flat-shaped end surfaces 13 like those of the first embodiment (FIG. 2) may be used instead of the first magnetic teeth 41.

The invention being thus described with reference to the first to sixth embodiments, the armature 100 of the rotating electric machine in one principal form (first embodiment) includes a plurality of first magnetic teeth 1 arranged side by side along the circumferential direction of the rotating electric machine and a plurality of second magnetic teeth 2 joined to the first magnetic teeth 1. The first magnetic tooth 1 has the yoke portion 11 extending along the circumferential direction and the tooth portion 12 extending from the central part of the yoke portion 11 inward along the radial direction of the rotating electric machine. There are formed the joint portions 14 along the inner edges (lower edges as illustrated) of both end surfaces 13 of each yoke portion 11, the joint portions 14 formed at the end surfaces 13 of the yoke portions 11 of each successive pair of adjacent first magnetic teeth 1 together forming the connecting part 16. The second magnetic teeth 2 extend along the aforementioned radial direction with the mating part 21 formed in the outer end surface (upper end surface as illustrated) of each second magnetic tooth 2. The individual second magnetic teeth 2 are joined to the first magnetic teeth 1 by fitting the mating parts 21 to the respective connecting parts 16. This construction of the armature 100 makes it possible to improve production efficiency because the number of manufacturing steps needed for assembling the magnetic teeth 1, 2 are much reduced.

According to one feature of the invention, one of the groups of the connecting parts 16 and of the mating parts 21 is formed into a groovelike shape while the other is formed into a protruding shape. Since only one of the connecting part 16 and the mating part 21 fitted together has the protruding shape extending along part of the entire axial length of the first and second magnetic teeth 1, 2, it becomes easier to insert each of the second magnetic teeth 2 between the adjacent first magnetic teeth 1 with the mating part 21 easily fitted to the connecting part 16.

According to another feature of the invention, the projecting portion 54 extending along the circumferential direction is formed at one end of the yoke portion 51 of each first magnetic tooth 41 while the recessed portion 53 is formed at the other end of the yoke portion 51, the projecting portion 54 of each first magnetic tooth 41 being fitted into the recessed portion 53 of the adjacent first magnetic tooth 41. This construction effectively prevents radial displacement of the adjacent first magnetic teeth 41, making it possible to manufacture armatures with high accuracy. This is because the recessed portions 53 and the projecting portions 54 of the adjacent first magnetic teeth 41 are securely fitted to one another in the aforementioned manner. This construction also makes it possible to suppress an increase in reluctance potentially caused by dividing a core into multiple magnetic teeth along the circumferential direction.

According to another feature of the invention, the armature 100 has a plurality of first magnetic teeth 61 which are bendably joined in a chainlike form by the flexible joints 64 disposed along outer edges of both end surfaces of the yoke portion 62 of each first magnetic tooth 61. This construction makes it possible to continuously wind the coils 3 and thereby achieve an improvement in production efficiency. Another advantage of this construction is increased ease of handling of the first magnetic teeth 61.

According to another feature of the invention, the coils 3 are individually wound around the tooth portions 12 of the first magnetic teeth 1 and around the second magnetic teeth 2. This construction makes it possible to manufacture armatures having coils wound around individual magnetic teeth with high production efficiency.

According to still another feature of the invention, one of the groups of the first magnetic teeth 41 (1) and of the second magnetic teeth 2 serves as main teeth on which the coils 3 are wound while the other serves as auxiliary teeth on which no coils are wound. This construction makes it possible to manufacture armatures with enhanced ease of assembly, in which main teeth and auxiliary teeth are alternately arranged along the circumferential direction.

According to yet another feature of the invention, each pair of joint portions 14 forming the connecting part 16 has a protruding shape sticking out in an extending direction of the tooth portion 12 while the mating part 21 has a dovetail groovelike shape in which the protruding connecting part 16 is fitted. This construction makes it possible to easily join the first magnetic teeth 1 and the second magnetic teeth 2 to form a single structure.

Seventh Embodiment

In the foregoing first, second, fourth, fifth and sixth embodiments, each connecting part 16, 57, 67 is formed of a pair of adjacent protruding joint portions 14, 55, 65, so that the second magnetic teeth 2 (auxiliary teeth 71) need to be inserted between the successive first magnetic teeth 1, 41, 61 with great force while fitting the groovelike mating parts 21, 72 on the protruding connecting parts 16, 57, 67. A seventh embodiment of the invention described below is particularly intended to facilitate a task of fitting individual mating parts to connecting parts.

Figure 19:
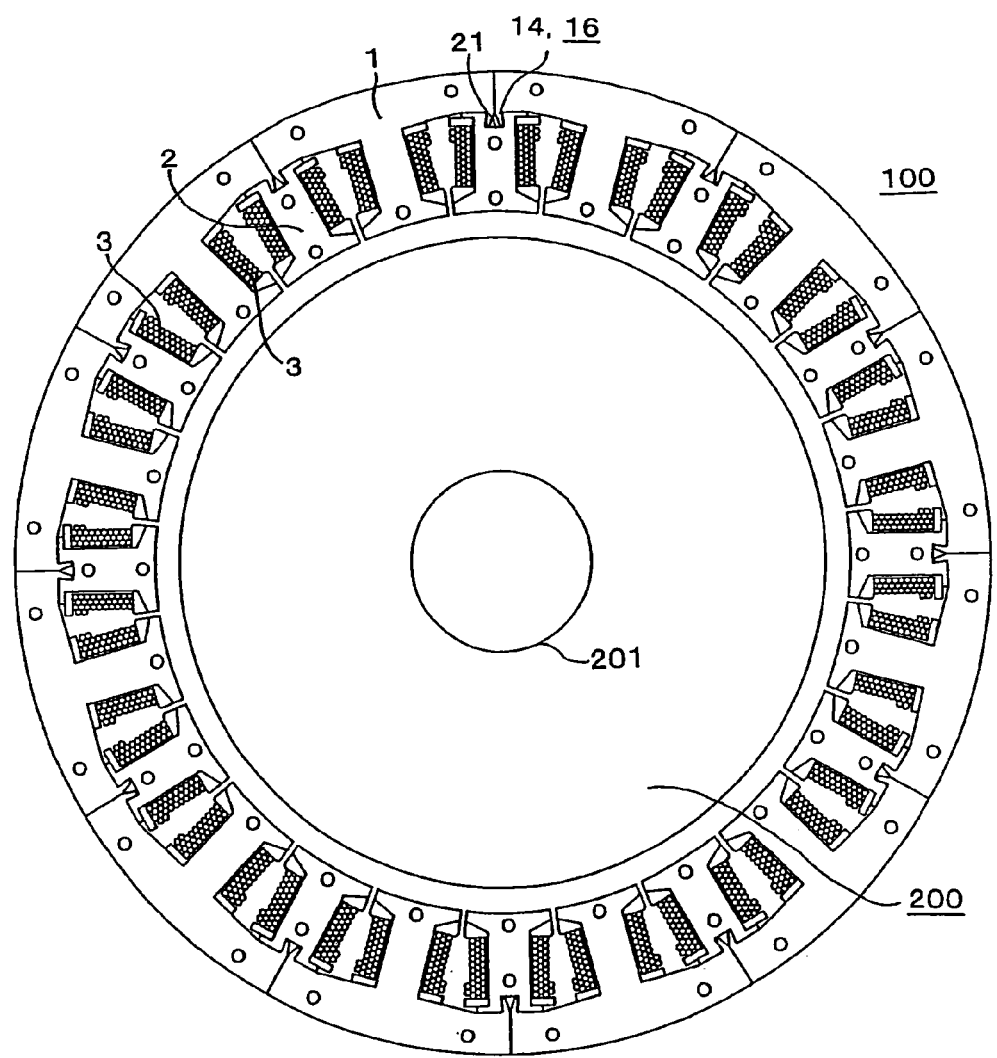
FIG. 19 is a plan view showing an armature of a rotating electric machine according to a seventh embodiment of the invention.
Figure 20:
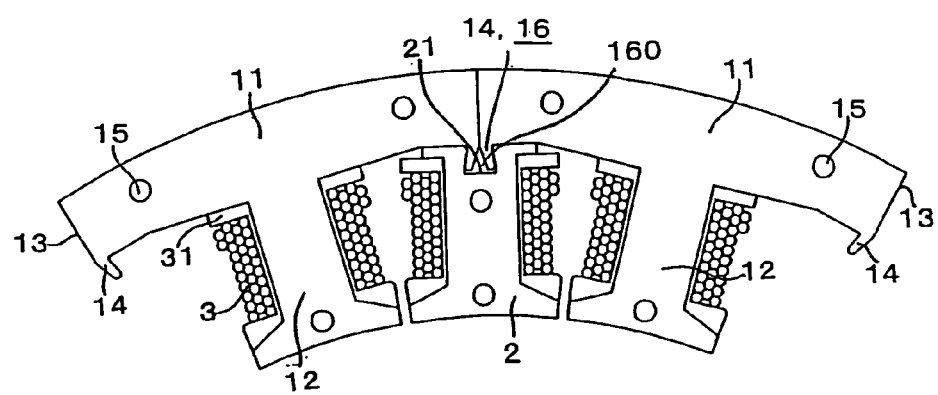
FIG. 20 is an enlarged diagram showing a principal portion of the armature of FIG. 19.

FIG. 19 is a plan view showing an armature 100 of a rotating electric machine according to the seventh embodiment of the invention, and FIG. 20 is an enlarged diagram showing a principal portion of the armature 100 of FIG. 19, in which elements identical or similar to those of the first embodiment are designated by the same reference numerals.

In this embodiment, there is formed a space 160 between adjacent joint portions 14 which together form a connecting part 16 as shown in FIGS. 19 and 20. This construction allows the joint portions 14 to elastically deform when inserted into each groovelike mating part 21.

Due to the provision of the space 160 formed between the adjacent joint portions 14, the connecting part 16 elastically deforms when fitted into the relevant mating part 21, so that it is easier to insert each second magnetic tooth 2 between adjacent first magnetic teeth 1 with the mating part 21 fitted on the connecting part 16. In this construction, the second magnetic tooth 2 can be easily inserted along the radial direction of the armature 100.

Eighth Embodiment

Figure 21:
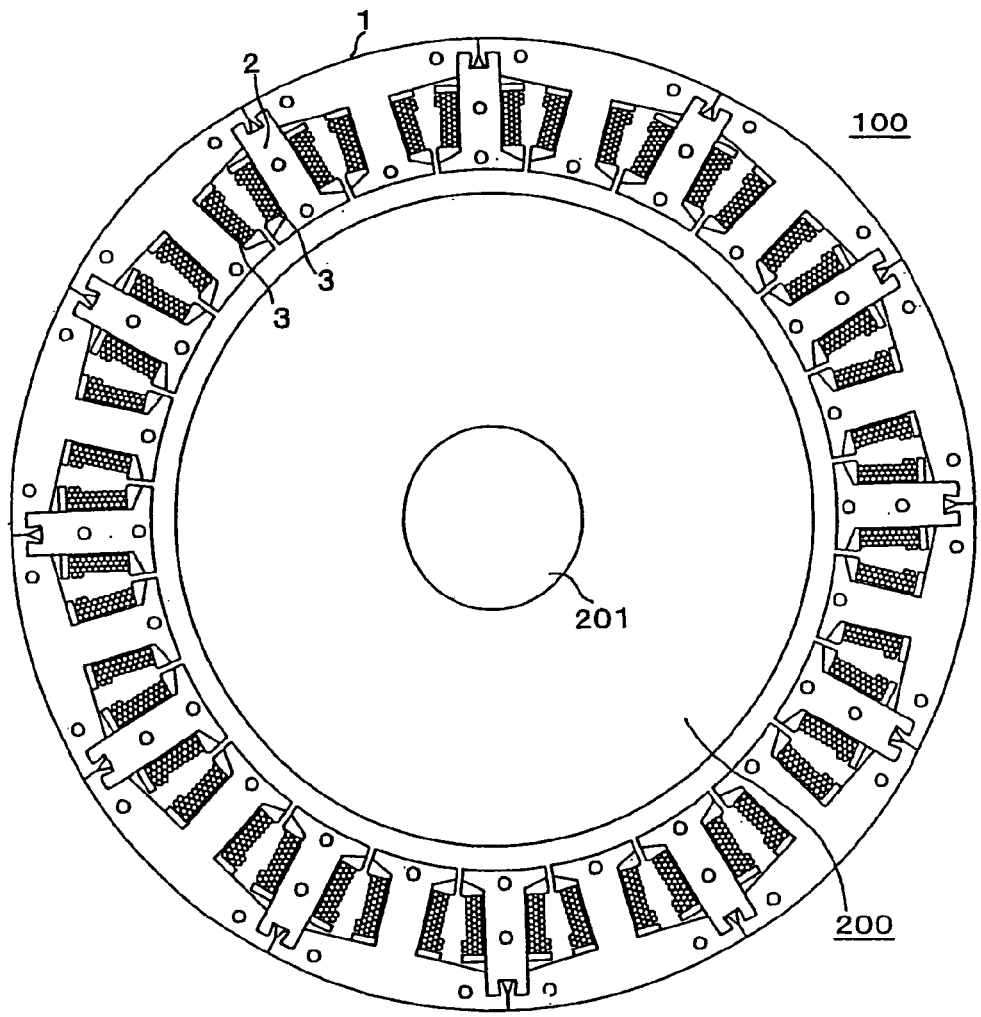
FIG. 21 is a plan view showing an armature of a rotating electric machine according to an eighth embodiment of the invention.
Figure 22:
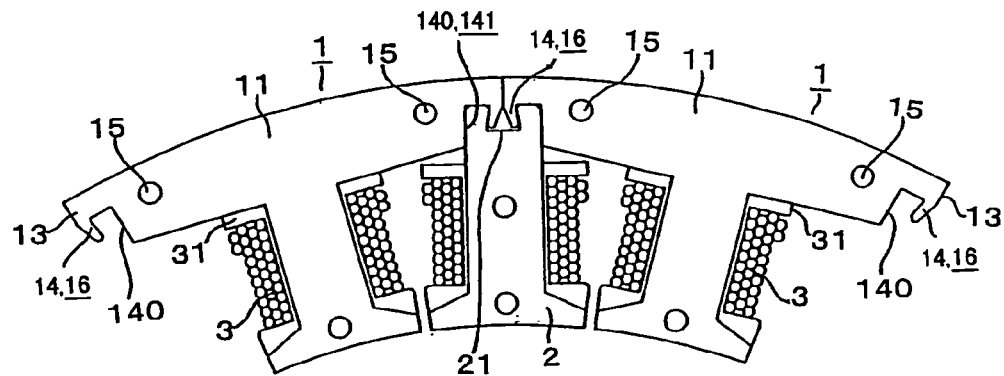
FIG. 22 is an enlarged diagram showing a principal portion of the armature of FIG. 21.
Figure 23:
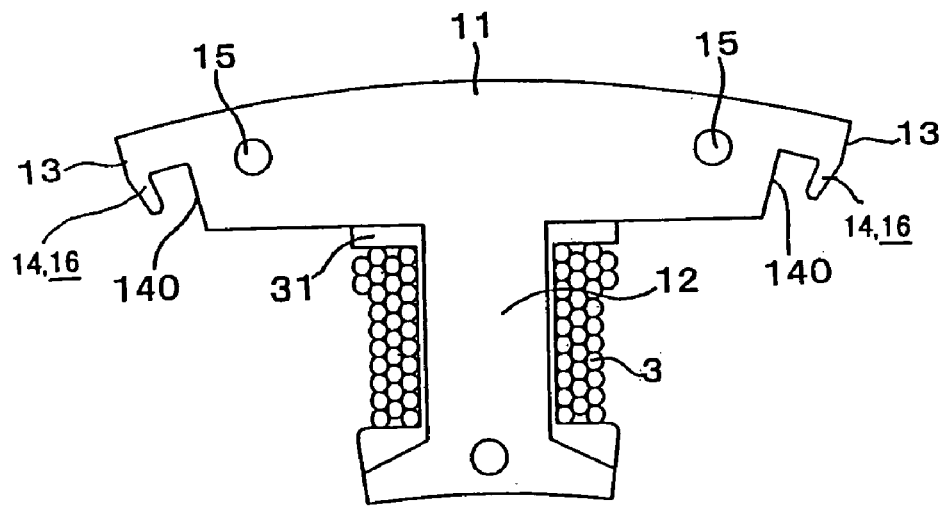
FIG. 23 is a plan view showing a first magnetic tooth of FIG. 21.
Figure 24:
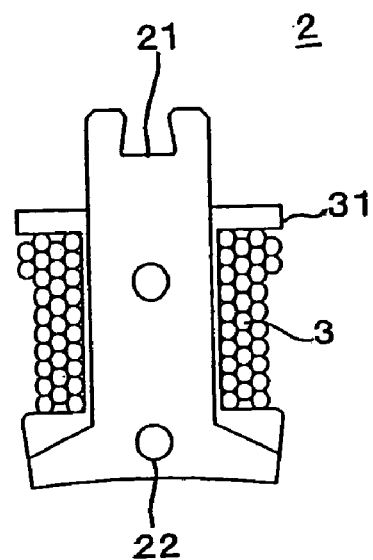
FIG. 24 is a plan view showing a second magnetic tooth of FIG. 21.
Figure 25:
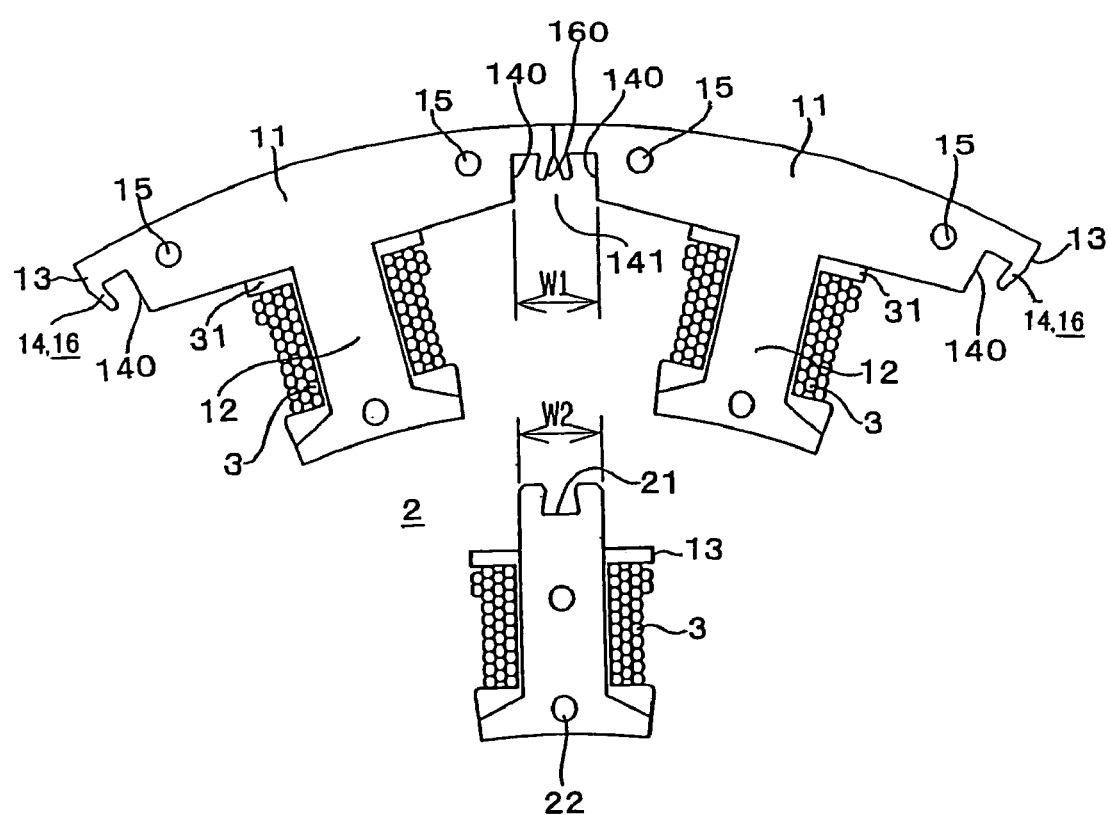
FIG. 25 is a plan view showing a relationship between the width of each cutout formed in the first magnetic tooth and the width of the second magnetic tooth.

FIG. 21 is a plan view showing an armature 100 of a rotating electric machine according to an eighth embodiment of the invention, FIG. 22 is an enlarged diagram showing a principal portion of the armature 100 of FIG. 21, FIG. 23 is a plan view showing one of first magnetic teeth 1 of FIG. 21, FIG. 24 is a plan view showing one of second magnetic teeth 2 of FIG. 21, and FIG. 25 is a plan view showing a relationship between the width of each cutout 140 formed in each first magnetic tooth 1 and the width W2 of each second magnetic tooth 2, in which elements identical or similar to those of the first embodiment are designated by the same reference numerals.

In this embodiment, there is formed a pair of cutouts 140 in opposite end surfaces 13 of a yoke portion 11 of each first magnetic tooth 1, protruding joint portions 14 being formed along inner edges (lower edges as illustrated in FIG. 23) of the end surfaces 13 as shown in FIGS. 22 to 25. When the first magnetic teeth 1 are arranged in a cylindrical form with the end surfaces 13 of the successive first magnetic teeth 1 held in mutual contact, the joint portions 14 of each successive pair of adjacent first magnetic teeth 1 together form a connecting part 16 and the cutouts 140 formed in the adjacent first magnetic teeth 1 together form a groovelike channel 141 therebetween. The width of each cutout 140 is such that the groovelike channel 141 formed by a pair of facing cutouts 140 has a width W1 which is approximately equal to the width W2 of each second magnetic tooth 2 as shown in FIG. 25.

Figure 26A:
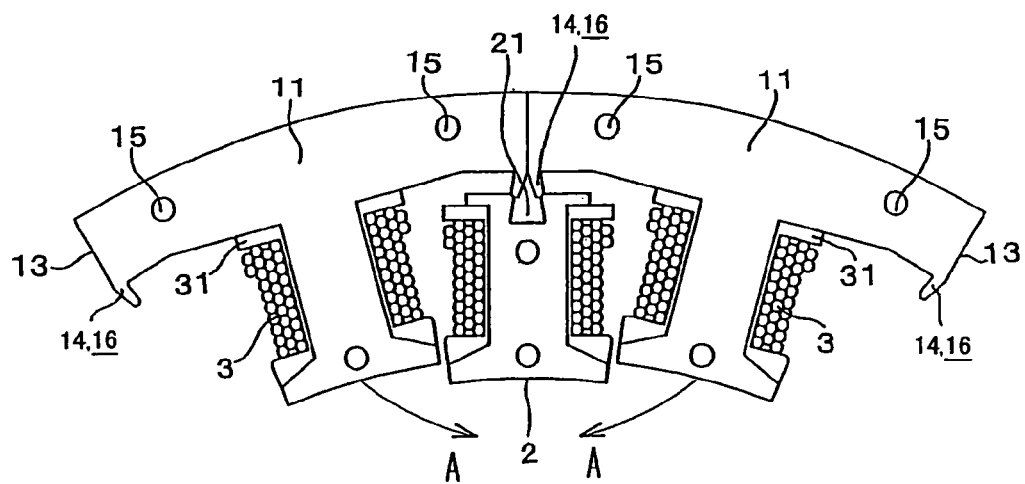
FIGS. 26A and 26B are plan views illustrating how two adjacent first magnetic teeth move when the second magnetic tooth is inserted between the two first magnetic teeth with a mating part of the second magnetic tooth fitted to a connecting part of the first magnetic teeth according to the eighth embodiment.
Figure 26B:
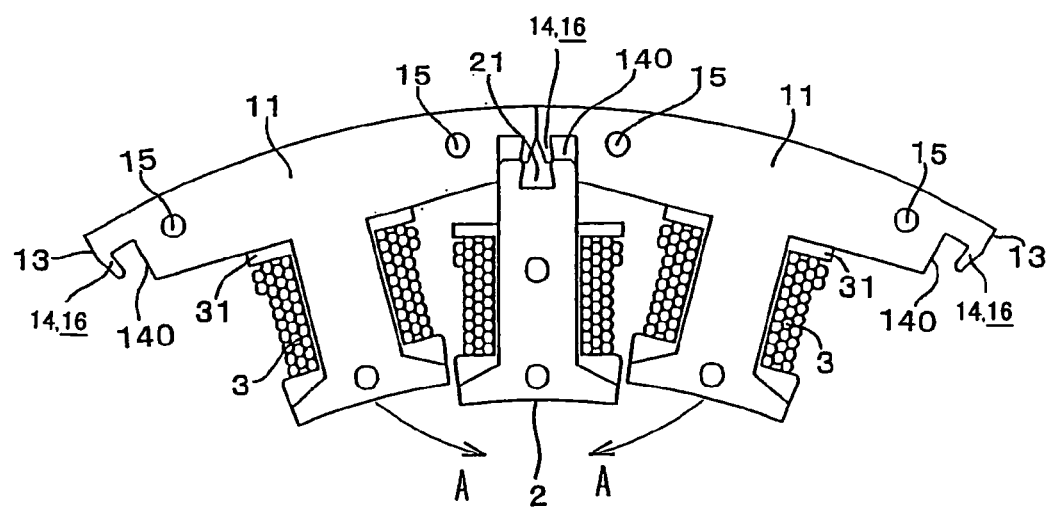

FIGS. 26A and 26B are plan views illustrating how two adjacent first magnetic teeth 1 move when the second magnetic tooth 2 is inserted between the first magnetic teeth 1 with a mating part 21 formed in the second magnetic tooth 2 fitted to the connecting part 16. When the mating part 21 is fitted to the connecting part 16, the two adjacent first magnetic teeth 1 tend to move in directions shown by arrows A in FIG. 26A in the construction of the foregoing seventh embodiment, potentially jeopardizing ease of assembly.

In contrast, the adjacent first magnetic teeth 1 do not swing in the directions of arrows A in the eighth embodiment when an outer fixing end of the second magnetic tooth 2 is fitted into the groovelike channel 141 (a pair of cutouts 140) formed between the two adjacent first magnetic teeth 1 as shown in FIG. 26B. This is because the outer fixing end of the second magnetic tooth 2 inserted into the groovelike channel 141 prevents the adjacent first magnetic teeth 1 from moving in the directions of arrows A. Therefore, the aforementioned construction of the eighth embodiment serves to prevent first magnetic teeth 1 from inclining sideways, thereby ensuring ease of assembly.

Furthermore, the construction of this embodiment, in which the second magnetic teeth 2 inserted into the respective groovelike channels 141, serves to increase contact areas between the first magnetic teeth 1 and the second magnetic teeth 2, making it possible to suppress an increase in magnetic loss (reluctance) potentially caused by dividing a core into multiple magnetic teeth along the circumferential direction.

Ninth Embodiment

Figure 27A:
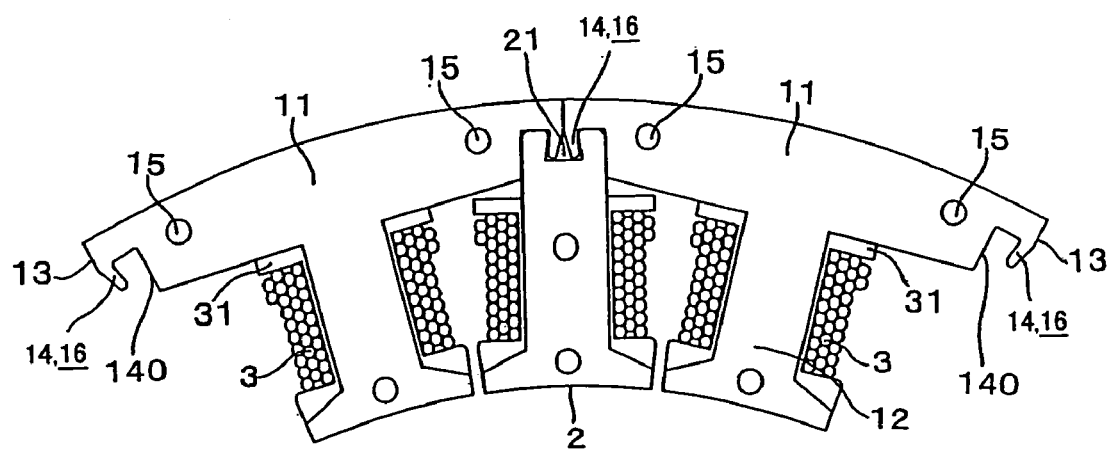
FIGS. 27A and 27B are plan views illustrating a problem that could occur when the second magnetic tooth become loosely connected to the first magnetic teeth due to gaps created between the mating part of the second magnetic tooth and the connecting part of the first magnetic teeth.
Figure 27B:
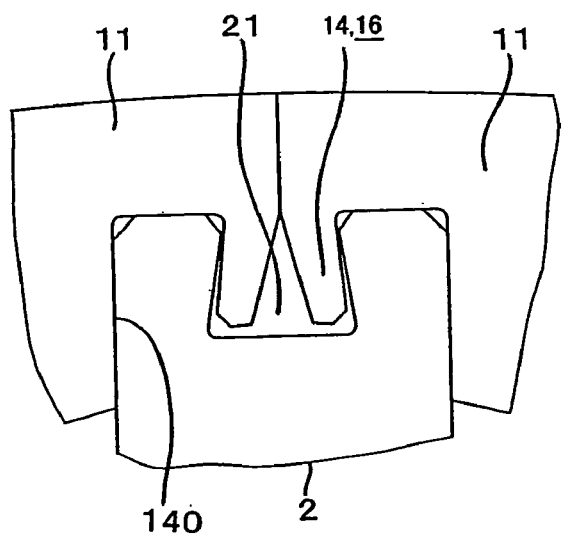
Figure 28:
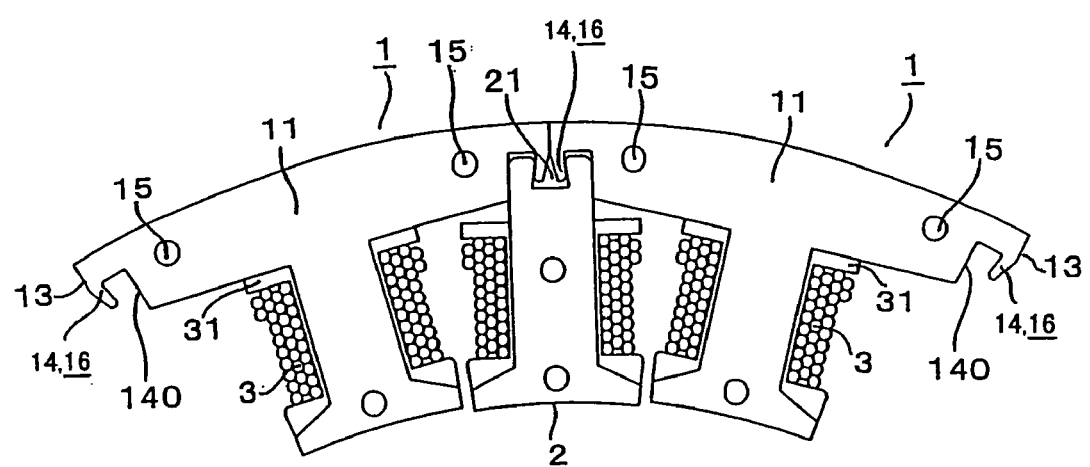
FIG. 28 is a plan view showing a situation in which the second magnetic tooth has become loosely connected between the two first magnetic teeth.

In the eighth embodiment described above, the connecting part 16 (a pair of joint portions 14) is fitted into the mating part 21 when each second magnetic tooth 2 is inserted between the adjacent first magnetic teeth 1. During this teeth-joining process, the joint portions 14 may plastically deform, producing gaps between the joint portions 14 and the mating part 21 as shown in FIGS. 27A and 27B. If such gaps are created, the second magnetic tooth 2 may be caused to lift from the first magnetic teeth 1 as shown in FIG. 28 due to an external force applied to the armature 100.

If any of the second magnetic teeth 2 becomes loose in the groovelike channel 141 due to gaps between the joint portions 14 and the mating part 21, the second magnetic tooth 2 and the adjacent first magnetic teeth 1 would easily be displaced by an external force during assembly process, causing deterioration of assembling efficiency. If the assembly process of the armature 100 is finished under conditions where gaps are formed between the joint portions 14 and the mating part 21 of any second magnetic tooth 2 as shown in FIG. 28, deterioration of properties, such as cogging and torque ripples, is likely to occur.

A ninth embodiment of the invention described below is particularly intended to provide a structure which would not cause deterioration of assembling efficiency or properties of a rotating electric machine by ensuring that no gaps are created between the connecting part 16 (a pair of joint portions 14) and the mating part 21.

Figure 29A:
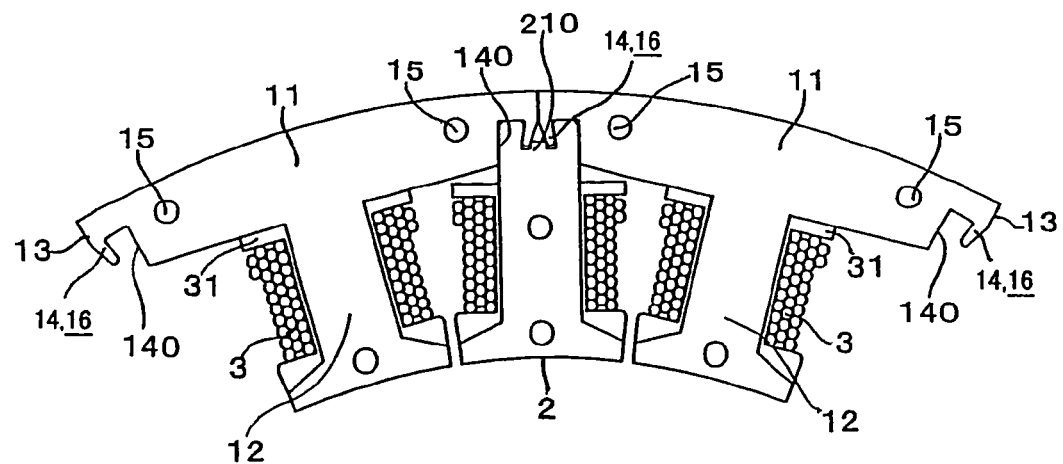
FIGS. 29A and 29B are plan views showing the construction of an armature of a rotating electric machine according to the ninth embodiment of the invention.
Figure 29B:
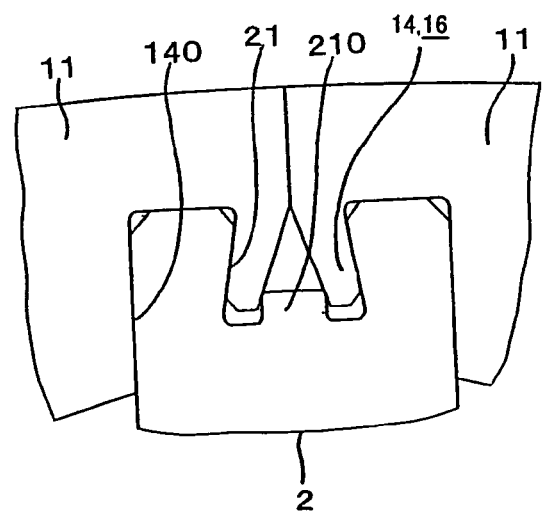

FIGS. 29A and 29B are plan views showing the construction of an armature 100 of a rotating electric machine according to the ninth embodiment of the invention, and FIGS. 30A, 30B, 30C and 30D are plan views showing a step-by-step process of fitting a mating part 21 to a connecting part 16, in which elements identical or similar to those of the first, seventh and eighth embodiments are designated by the same reference numerals. Of these Figures, FIG. 29A is a diagram showing a principal portion of the armature 100 and FIG. 29B is an enlarged fragmentary diagram showing part of the principal portion shown in FIG. 29A.

In this embodiment, there is formed a joint portion positioner 210 having a rectangular cross section protruding from a central part of the bottom of the dovetail grooveshaped mating part 21 formed in each second magnetic tooth 2 as shown in FIGS. 29A and 29B. As in the eighth embodiment, each connecting part 16 is formed of a pair of joint portions 14 of which slanted "outer surfaces" go into contact with inner side walls of the mating part 21 when the joint portions 14 are fitted therein. The joint portion positioner 210 is shaped such that "inner surfaces" (opposite sides of the outer surfaces) of the joint portions 14 come into contact with the joint portion positioner 210 when the joint portions 14 are fitted in the mating part 21.

Figure 30A:
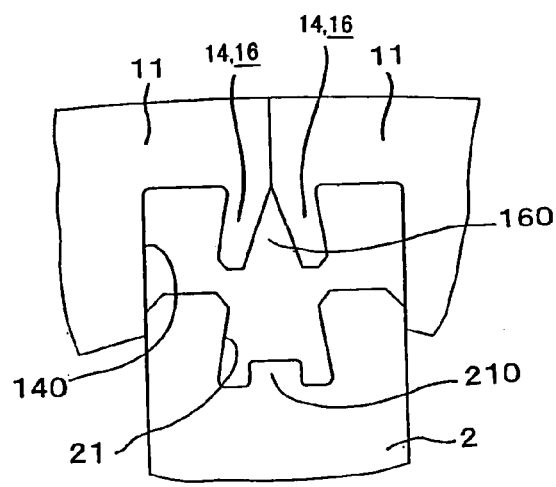
FIGS. 30A, 30B, 30C and 30D are plan views showing a step-by-step process of fitting a mating part to a connecting part.
Figure 30B:
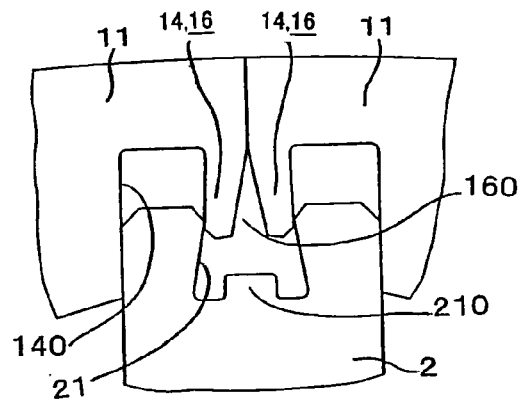
Figure 30C:
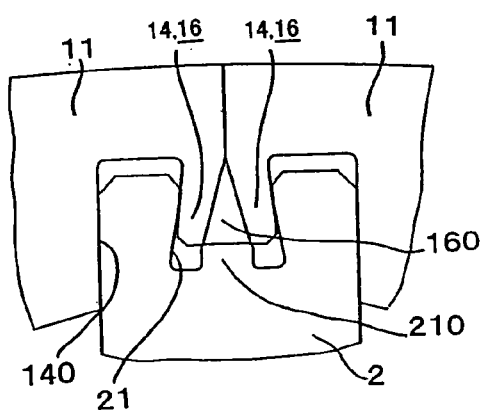
Figure 30D:
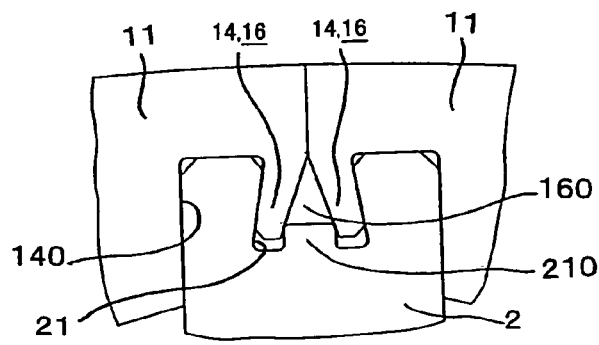

Each second magnetic tooth 2 is inserted between two adjacent first magnetic teeth 1 following the sequence shown in FIGS. 30A, 30B, 30C and 30D. When the second magnetic tooth 2 is pushed in between the two adjacent first magnetic teeth 1, edges of the mating part 21 go into contact with the connecting part 16 (a pair of joint portions 14) and the joint portions 14 are caused to plastically deform in a manner that a space 160 between the joint portions 14 becomes narrower, as shown in FIG. 30B. If the second magnetic tooth 2 is further pushed in, the space 160 between the joint portions 14 slightly widens due to their residual elasticity. However, the joint portions 14 still remain closer to each other due to plastic deformation so that the inner surfaces of the joint portions 14 go into contact with the joint portion positioner 210 as shown in FIG. 30C. If the second magnetic tooth 2 is further pushed in from this position, the plastically deformed joint portions 14 are forced outward by the joint portion positioner 210 as shown in FIG. 30D.

With the provision of the joint portion positioner 210 protruding from the central part of the bottom of the dovetail groove-shaped mating part 21 which is formed in each of the second magnetic teeth 2, it becomes possible to prevent a loose fit between the mating part 21 and the joint portions 14 due to gaps created between the first and second magnetic teeth 1, 2 when each second magnetic tooth 2 is inserted between the two adjacent first magnetic teeth 1. This construction of the ninth embodiment makes it possible to achieve stable ease of assembly and magnetic properties.

If the two joint portions 14 of the connecting part 16 are pushed outward by the joint portion positioner 210 as stated above, the second magnetic tooth 2 may be forced back inward along the radial direction of the rotating electric machine due to the residual elasticity of the joint portions 14.

Figure 31:
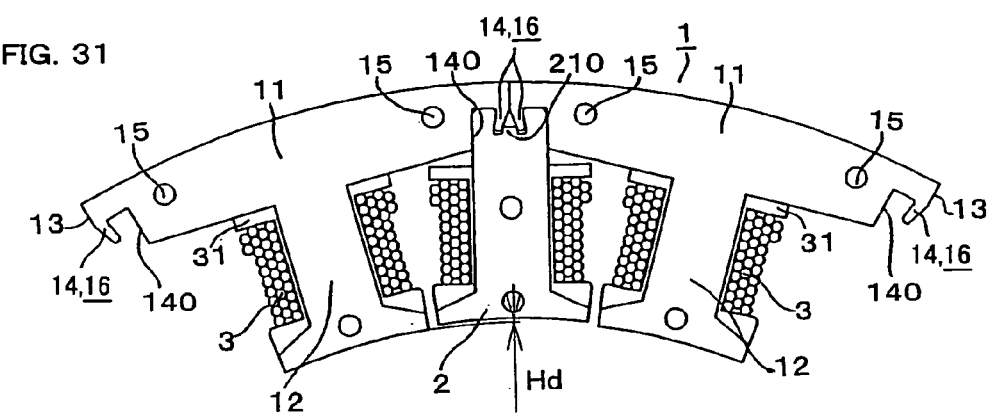
FIG. 31 is a plan view showing one preferred variation of the ninth embodiment.

Accordingly, it is preferable from the viewpoint of assembling efficiency and properties of the rotating electric machine to structure the armature 100 in such a fashion that an inner end surface of each second magnetic tooth 2 opposite to an outer end surface thereof in which the mating part 21 is formed is recessed from an inner end surface of the tooth portions 12 of the adjacent first magnetic teeth 1 toward the yoke portion 11 thereof by a specific amount Hd as shown in FIG. 31.

Figure 32:
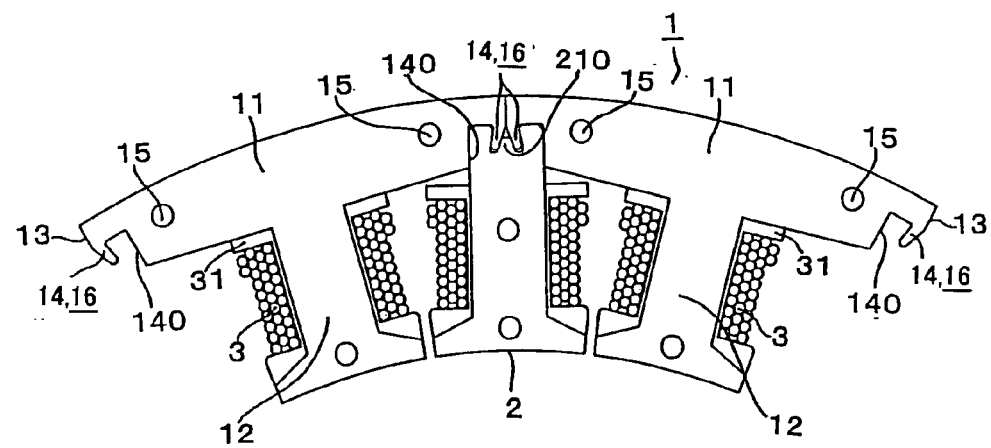
FIG. 32 is a plan view showing another variation of the ninth embodiment.

While the joint portion positioner 210 has a rectangular protruding form in the ninth embodiment discussed above, the joint portion positioner 210 may be shaped into a rectangular trapezoidal form in cross section as shown in FIG. 32 in another preferred variation of the embodiment. This variation of the embodiment makes it possible to effectively use the space 160 between the joint portions 14 of each connecting part 16 as a magnetic path since the space 160 is filled up by the joint portion positioner 210.

Figure 33:
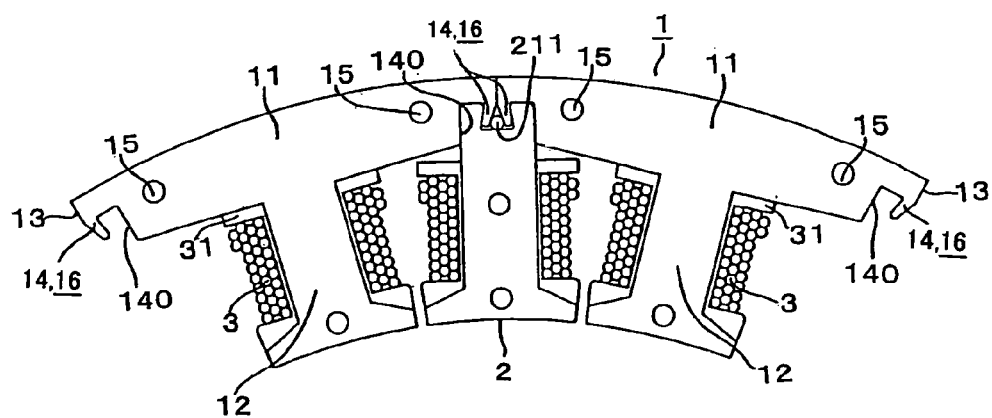
FIG. 33 is a plan view showing still another variation of the ninth embodiment.

Also, while the joint portion positioner 210 having a protruding form in cross section is formed in the joint portion positioner 210 in the ninth embodiment and variations thereof, there may be placed a straight rod member 211 which comes into contact with both the inner surfaces of the joint portions 14 and the bottom of the mating part 21 instead of forming the protruding joint portion positioner 210 as shown in FIG. 33 in still another variation of the embodiment. This variation offers the same advantageous effects as the aforementioned ninth embodiment and the variations thereof.

Figure 34A:
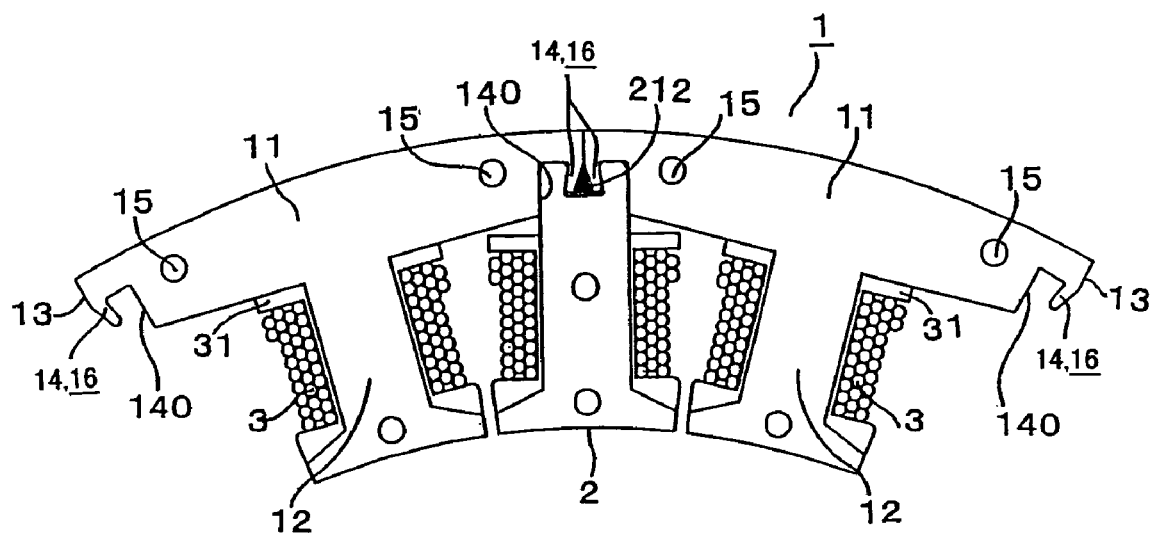
FIGS. 34A and 34B are plan views showing a further variation of the ninth embodiment.
Figure 34B:
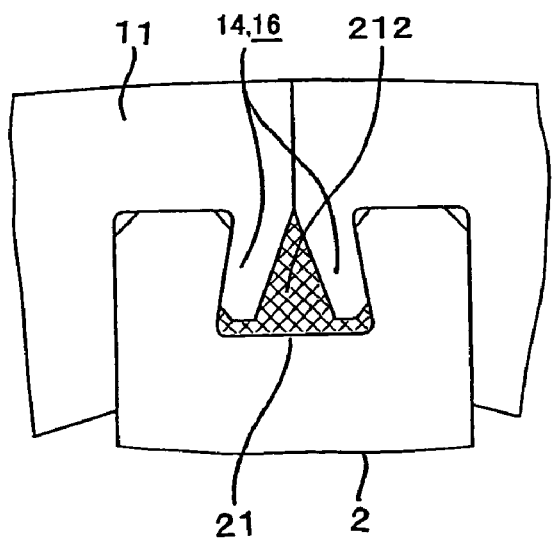

Furthermore, it is also possible to prevent a loose fit between each second magnetic tooth 2 and the adjacent first magnetic teeth 1 by injecting or applying resin material 212 like synthetic adhesive to fill up a space surrounded by the joint portions 14 and the mating part 21 as shown in FIGS. 34A and 34B.

While the ninth embodiment has been described with reference to examples in which a pair of cutouts 140 is formed in each first magnetic tooth 1 and coils 3 are wound around the individual second magnetic teeth 2, the aforementioned structure of the joint portion positioner 210 of the ninth embodiment and the variations thereof are also applicable to the previously described constructions of the sixth and seventh embodiments in which no cutouts are formed in the individual first magnetic teeth 1 and/or no coils are wound around the second magnetic teeth (auxiliary teeth 71).

Tenth Embodiment

Figure 35:
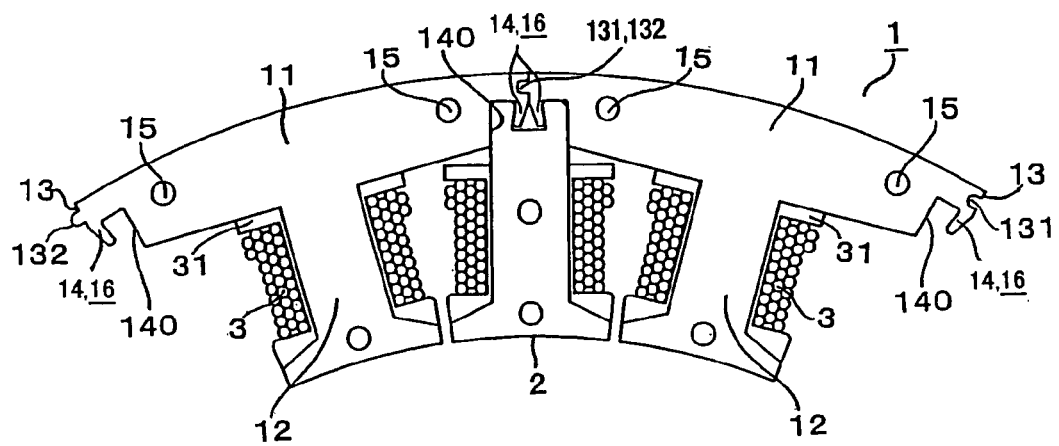
FIG. 35 is a plan view showing the construction of an armature of a rotating electric machine according to a tenth embodiment of the invention.
Figure 36:
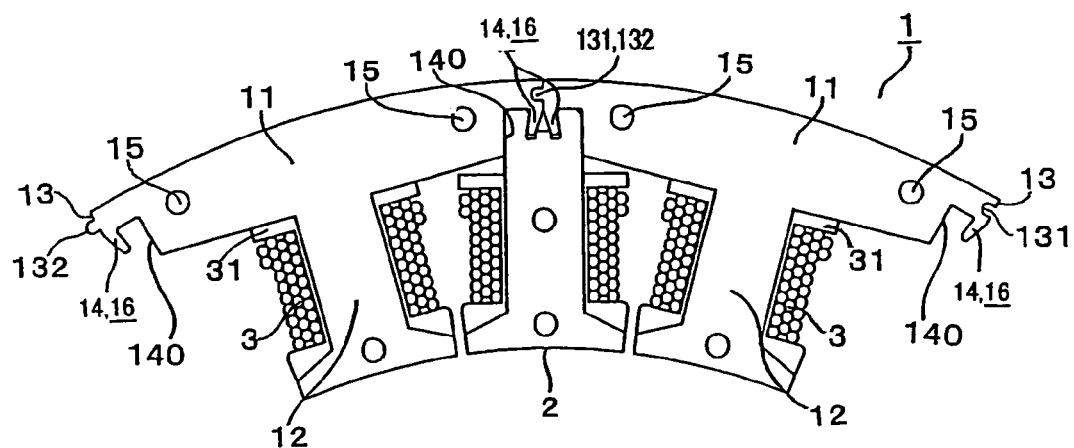
FIG. 36 is a plan view showing one preferred variation of the tenth embodiment.

FIG. 35 is a plan view showing the construction of an armature 100 of a rotating electric machine according to a tenth embodiment of the invention, and FIG. 36 is a plan view showing one preferred variation of the tenth embodiment, in which elements identical or similar to those of the foregoing embodiments are designated by the same reference numerals.

The aforementioned construction of the ninth embodiment prevents the loose fit between each second magnetic tooth 2 and the adjacent first magnetic teeth 1 by forming the joint portion positioner 210 at the central part of the bottom of the dovetail groove-shaped mating part 21 formed in each second magnetic tooth 2. In contrast, there are formed a groove 131 and a protrusion 132 at opposite end surfaces 13 of a yoke portion 11 of each first magnetic tooth 1 in the tenth embodiment so that the protrusion 132 formed in the end surface 13 of each first magnetic tooth 1 fits into the groove 131 formed on the end surface 13 of the adjacent first magnetic tooth 1 as shown in FIG. 35. This construction of the tenth embodiment serves to prevent outward swelling, or radial displacement, of the first magnetic teeth 1 as a result of sliding between the facing end surfaces 13 of the adjacent first magnetic teeth 1 due to an externally applied force.

In the variation of the tenth embodiment shown in FIG. 36, each second magnetic tooth 2 has a joint portion positioner 210 formed in the mating part 21. This combination of the groove 131, the protrusion 132 and the joint portion positioner 210 serves to prevent mutual displacement between the adjacent first magnetic teeth 1 and between the first magnetic teeth 1 and the second magnetic teeth 2 due to an external force.

While a pair of cutouts 140 is formed in each first magnetic tooth 1 and coils 3 are wound around the individual second magnetic teeth 2 in the illustrated examples (FIGS. 35 and 36) of the tenth embodiment, the grooves 131 and the protrusions 132 may also be formed in the previously described constructions of the sixth and seventh embodiments in which no cutouts are formed in the individual first magnetic teeth 1 and/or no coils are wound around the second magnetic teeth (auxiliary teeth 71).

What is claimed is:

1. An armature of a rotating electric machine, said armature comprising:

a plurality of first magnetic teeth arranged side by side along a circumferential direction of the rotating electric machine; and a plurality of second magnetic teeth joined to the first magnetic teeth;

wherein each of the first magnetic teeth has a yoke portion extending along the circumferential direction, end surfaces of the yoke portions of two adjacent magnetic teeth are positioned directly face to face with one another, a tooth portion extending from a central part of the yoke portion inward along a radial direction of the rotating electric machine, and a pair of joint portions formed along inner edges of both end surfaces of the yoke portion, the joint portions formed at the facing end surfaces of the yoke portions of each successive pair of adjacent first magnetic teeth together forming a connecting part, wherein each pair of adjacent joint portions forming the connecting part has a protruding shape sticking out in an extending direction of the tooth portion while the mating part has a dovetail groovelike shape;

wherein each of the second magnetic teeth extends along the radial direction with a mating part formed at an outer end surface of each second magnetic tooth; and wherein each second magnetic tooth directly joining together the end surfaces of the yoke portions of two adjacent first magnetic teeth by fitting the connecting part of the two adjacent first magnetic teeth to the mating part.

2. The armature of the rotating electric machine according to claim 1, wherein the protruding shape extends along part of the entire axial length of the first and second magnetic teeth.

3. The armature of the rotating electric machine according to one of claim 1, wherein a projecting portion extending along the circumferential direction is formed at one end of the yoke portion of each first magnetic tooth while a recessed portion is formed at the other end, and wherein the projecting portion of each first magnetic tooth is fitted into the recessed portion of the adjacent first magnetic tooth to prevent radial displacement of the adjacent first magnetic teeth.

4. The armature of the rotating electric machine according to one of claim 1, wherein the successive first magnetic teeth are bendably joined in a chainlike form by flexible joints disposed at both ends of the yoke portion of each first magnetic tooth.

5. The armature of the rotating electric machine according to one of claim 1, wherein coils are individually wound around the tooth portions the first magnetic teeth and around the second magnetic teeth.

6. The armature of the rotating electric machine according to one of claim 1, wherein one of the groups of the first magnetic teeth and of the second magnetic teeth serves as main teeth on which the coils are wound while the other serves as auxiliary teeth on which no coils are wound.

7. The armature of the rotating electric machine according to claim 1, wherein the end surfaces of the yoke portions of each successive pair of adjacent first magnetic teeth are placed in mutual contact and a space is created between the adjacent protruding joint portions.

8. The armature of the rotating electric machine according to claim 7, wherein there is formed a pair of cutouts in the opposite surfaces of the yoke portion of each first magnetic tooth, and the cutouts formed in each successive pair of adjacent first magnetic teeth together form a groovelike channel in which an outer fixing end of each second magnetic tooth where the mating part is formed is inserted.

9. The armature of the rotating electric machine according to claim 7, wherein there is provided a joint portion positioner at the bottom of the dovetail groove-shaped mating part formed in each second magnetic tooth for pushing the joint portions fitted therein against inner side walls of the dovetail groove-shaped mating part, the joint portion positioner being formed of one of a protruding raillike member and a rod member.

10. The armature of the rotating electric machine according to claim 9, wherein an inner end surface of each second magnetic tooth opposite to an outer end surface thereof in which the mating part is formed is recessed from an inner end surface of the tooth portions of the adjacent first magnetic teeth by a specific amount.

11. The armature of a rotating electric machine according to claim 1, wherein a groove is formed in one end surface of the yoke portion of each first magnetic tooth and a protrusion is formed on the opposite end surface of the yoke portion, and wherein the protrusion formed on the yoke portion of each first magnetic tooth is fitted in the groove formed in the yoke portion of the adjacent first magnetic teeth.

* * * * *